(12) United States Patent
    Zimmerman

(10) Patent No.:     US 12,657,605 B2
(45) **Date of Patent:        *Jun. 16, 2026**

(54) DYNAMICALLY ARRANGED DIGITAL CIRCULARS

(71) Applicant: Design House, Inc., Solon, OH (US)

(72) Inventor: Adam Zimmerman, Solon, OH (US)

(73) Assignee: Design House, Inc., Chagrin Falls, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/760,865

(22) Filed: Jul. 1, 2024

(65) Prior Publication Data

US 2025/0005619 A1      Jan. 2, 2025

Related U.S. Application Data

(60) Provisional application No. 63/511,091, filed on Jun. 29, 2023.

(51) Int. Cl.
    *G06Q 30/00*         (2023.01)
    *G06Q 30/0207*       (2023.01)
                (Continued)

(52) U.S. Cl.
    CPC ..... *G06Q 30/0256* (2013.01); *G06Q 30/0222* (2013.01); *G06Q 30/0276* (2013.01); *G06Q 30/0277* (2013.01)

(58) Field of Classification Search
    CPC .......................................... G06Q 30/02–0277
    See application file for complete search history.

(56) References Cited

U.S. PATENT DOCUMENTS 7,315,983 B2      1/2008      Evans et al.
7,665,105 B2      2/2010      Evans
                (Continued)

FOREIGN PATENT DOCUMENTS

WO      WO-2011123676 A1 * 10/2011      ............. G06Q 30/02

OTHER PUBLICATIONS

"Marketing Spot Optimization" ip.com Disclosure No. IPCOM000229301D Publication Date: Jul. 19, 2013 (Year: 2013) (Year: 2013).*

(Continued)

*Primary Examiner* — Raquel Alvarez

(74) *Attorney, Agent, or Firm* — Taft Stettinius & Hollister LLP

(57)      ABSTRACT

A retail media network system that dynamically arranges and/or resizes item cards containing item content from various vendors in a digital circular. A selection of a digital advertisement associated with a vendor and a retailer can trigger the system to utilize vendor parameters associated with that vendor such that the item card of that vendor is positioned in a primary position in the digital circular, while item cards not associated with that vendor are arranged at secondary positions. The system can therefore dynamically arrange the digital circular in response to user selections of digital advertisements that are associate with different vendors, and thus in accordance with the particular vendor parameters of those different vendors. The system can also track user visits to stores of the retailers in connection with evaluating direct and compound returns to the vendors for expenditures related to associated digital advertisements and/or placement in digital circulars.

20 Claims, 10 Drawing Sheets

(51) Int. Cl.
  *G06Q 30/0241*  (2023.01)
  *G06Q 30/0251*  (2023.01)

(56)       References Cited

U.S. PATENT DOCUMENTS

| | | | |
|---|---|---|---|
| 7,673,237 | B2 | 3/2010 | Evans et al. |
| 7,698,719 | B2 | 4/2010 | Evans et al. |
| 7,707,081 | B2 | 4/2010 | Evans et al. |
| 7,774,715 | B1 | 8/2010 | Evans |
| 7,890,873 | B2 | 2/2011 | Evans |
| 8,285,590 | B2 | 10/2012 | Evans |
| 8,296,183 | B2 | 10/2012 | Evans |
| 2006/0161635 | A1 | 7/2006 | Lamkin et al. |
| 2011/0085211 | A1 | 4/2011 | King et al. |
| 2012/0278831 | A1 | 11/2012 | van Coppenolle et al. |
| 2013/0044113 | A1* | 2/2013 | Cheung .................. G06F 16/35 |
| | | | 345/441 |
| 2014/0297377 | A1* | 10/2014 | Bhat ................. G06Q 30/0276 |
| | | | 705/14.66 |
| 2019/0130873 | A1 | 5/2019 | Shaw et al. |
| 2022/0230198 | A1 | 7/2022 | Wolinsky et al. |

OTHER PUBLICATIONS

International Search Report and Written Opinion of the International Searching Authority; International Searching Authority; International Patent Application No. PCT/US2024/36429; Sep. 23, 2024; 11 pages.

Extended European Search Report; European Patent Office; European Application No. 24833153.0; Nov. 14, 2025; 12 pages.

\* cited by examiner

| | Category | Price | Start Date | End Date | Artwork | Card/Grid Size | Hidden |
|---|---|---|---|---|---|---|---|
| Product #1 | Meat | $5.50/lb | 04/01/2023 | 04/08/2023 | Image | 2x3 | |
| Product #2 | Candy | $4.50 | 04/02/2023 | 04/12/2023 | Video | 1x1 | X |
| Product #3 | Meat | $3.33/lb | 04/03/2023 | 04/06/2023 | Animation | 3x1 | |
| Product #4 | Dairy | $3.99 | 04/01/2023 | 05/06/2023 | Image | 2x1 | |

| Store Number | Store Name | Address | Base URL | Promotional URL |
|---|---|---|---|---|
| 32, 34 | 32, 36 | 32, 38 | 32, 40 | 32, 42 |

DYNAMICALLY ARRANGED DIGITAL CIRCULARS

CROSS REFERENCE TO RELATED APPLICATION

This application claims the benefit of U.S. Provisional Application No. 63/511,091 filed Jun. 29, 2023, the disclosure of which is hereby incorporated herein by reference in its entirety.

TECHNICAL FIELD

The present disclosure generally relates to media networks for generating digital circulars and engagement materials, and more particularly, but not exclusively, to dynamic configuration ranking for, and tracking compound returns from, digital circulars.

BACKGROUND

Traditionally, at least certain entities involved in the sale of consumer goods and services, referred to herein generally as products, have utilized print, radio, television, internet, and/or cable to communicate to consumers product sales and discounts, among other product related promotions. Certain businesses or organizations have promoted product offerings via printed publications in the form of weekly circulars that can be, for example, bundled with newspapers and delivered to consumers' residences and/or made available at the entrance to an associated entity or franchise of the business or organization. An electronic version of such circulars can also be provided in a portable document format (e.g., .pdf file format).

Yet, such printed and digital versions of circulars are typically static with respect to the presentation or arrangement of the advertised products identified in the circulars. Such static presentations can be adverse with at least respect to the ability to effectively target different products in the circular to different consumer groups. For example, the marketing costs for placement of a product(s) advertisement in a circular can correspond to the prominence of the position at which the advertisement is to be placed in the circular. Yet, such static circulars can contribute to vendors receiving limited value with respect to a return on such marketing expenditures, including with respect to the number of impressions or opportunities for the advertised product(s) from those vendors being seen by at least certain target consumer groups. For example, at least certain products that may be of particular interest to certain consumer groups can, relative to other product advertisements, be at generally obscured locations within the circular. Further, in such situations, the vendor paying for a prominent, or primary, position in the circular may not be of interest to particular consumers, and thereby not receive the benefit of paying for a more costly position in the circular.

Existing systems therefore have various shortcomings relative to certain applications. Accordingly, there remains a need for further contributions in this area of technology.

SUMMARY

The present disclosure may comprise one or more of the following features and combinations thereof.

In one embodiment of the present disclosure, a dynamic retail media network system is provided for generating a digital circular displayed to a user via a communications device based on a plurality of vendor parameters that dynamically trigger a generation and display of a plurality of circular content items included in the digital circular associated with a retailer. The dynamic retail media network system can include at least one processor and a memory coupled with the processor. The memory can include instructions that, when executed by the processor, can cause the processor to provide access to a digital media platform associated with the retailer in response to an end user selection of a digital advertisement of a plurality of digital advertisements, each digital advertisement of the plurality of advertisements being associated with the retailer and a different vendor of a plurality of vendors that vend with the retailer. The memory can also include instructions that, when executed by the processor, can cause the processor to trigger the vendor parameters associated with the vendor of the selected digital advertisement to determine a position of each item card of a plurality of item cards to be displayed in the digital circular associated with the retailer based on the vendor parameters associated with the vendor of the selected digital advertisement. The vendor parameters associated with the vendor of the selected digital advertisement can be indicative of a presentation of each item card as displayed in the digital circular of the retailer, and can be based on a vendor priority to display the selected item card associated with the vendor of the selected digital advertisement as compared to item cards not associated with the vendor of the selected digital advertisement. Additionally, the memory can include instructions that, when executed by the processor, can cause the processor to generate the digital circular of the retailer that includes the item cards created based on the vendor parameters associated with the vendor of the selected digital advertisement that displays the selected item card based on the display request of the vendor of the selected digital advertisement. Further, the selected item card can be displayed based on the display request of the vendor of the selected digital advertisement as compared to the item cards not associated with the vendor of the selected digital advertisement. The memory can also include instructions that, when executed by the processor, can cause the processor to instruct the communications device to dynamically display each item card in an item card position and item card size to prioritize the display of the selected item card in the digital circular based on the vendor parameters. Further, each item card can be dynamically formatted to be displayed after the selected item card is dynamically formatted to be displayed based on the vendor parameters thereby displaying the selected item card based on the display request of the vendor of the selected digital advertisement as compared to item cards not associated with the vendor of the selected digital advertisement.

In another embodiment, a dynamic retail media network method is provided for generating a digital circular displayed to a user via a communications device based on a plurality of vendor parameters that dynamically trigger a generation and display of a plurality of digital circular content items included in the digital circular associated with a retailer. The method can include providing access to a digital media platform associated with the retailer in response to an end user selection of a digital advertisement of a plurality of digital advertisements, each digital advertisement of the plurality of advertisements being associated with the retailer and a different vendor of a plurality of vendors that vend with the retailer. Additionally, the method can include triggering the vendor parameters associated with a vendor of the selected digital advertisement to determine a position of each item card of a plurality of item cards to be displayed in the digital circular associated with retailer based on the vendor parameters associated with the vendor of the selected digital advertisement. The vendor parameters associated with the vendor of the selected digital advertisement can be indicative of a presentation of each item card as displayed in the digital circular of the retailer and be based on a vendor priority to display the selected item cared associated with the vendor of the selected digital advertisement as compared to item cards not associated with the vendor of the selected digital advertisement. Additionally, the digital circular of the retailer can be generated that includes the item cards created based on the vendor parameters associated with the vendor of the selected digital advertisement that displays the selected item card based on the display request of the vendor of the selected digital advertisement. The selected item card can be displayed based on the display request of the vendor of the selected digital advertisement as compared to the item cards not associated with the vendor of the selected digital advertisement. The method can also include instructing the communications device to dynamically display each item card in an item card position and item card size to prioritize the display of the selected item card in the digital circular based on the vendor parameters, wherein each item card is dynamically formatted to be displayed after the selected item card is dynamically formatted to be displayed based on the vendor parameters thereby displaying the selected item card based on the display request of the vendor of the selected digital advertisement as compared to item cards not associated with the vendor of the selected digital advertisement.

These and other features of the present disclosure will become more apparent from the following description of the illustrative embodiments.

BRIEF DESCRIPTION OF THE FIGURES

The concepts described herein are illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION OF THE ILLUSTRATIVE EMBODIMENTS

Figure 1:
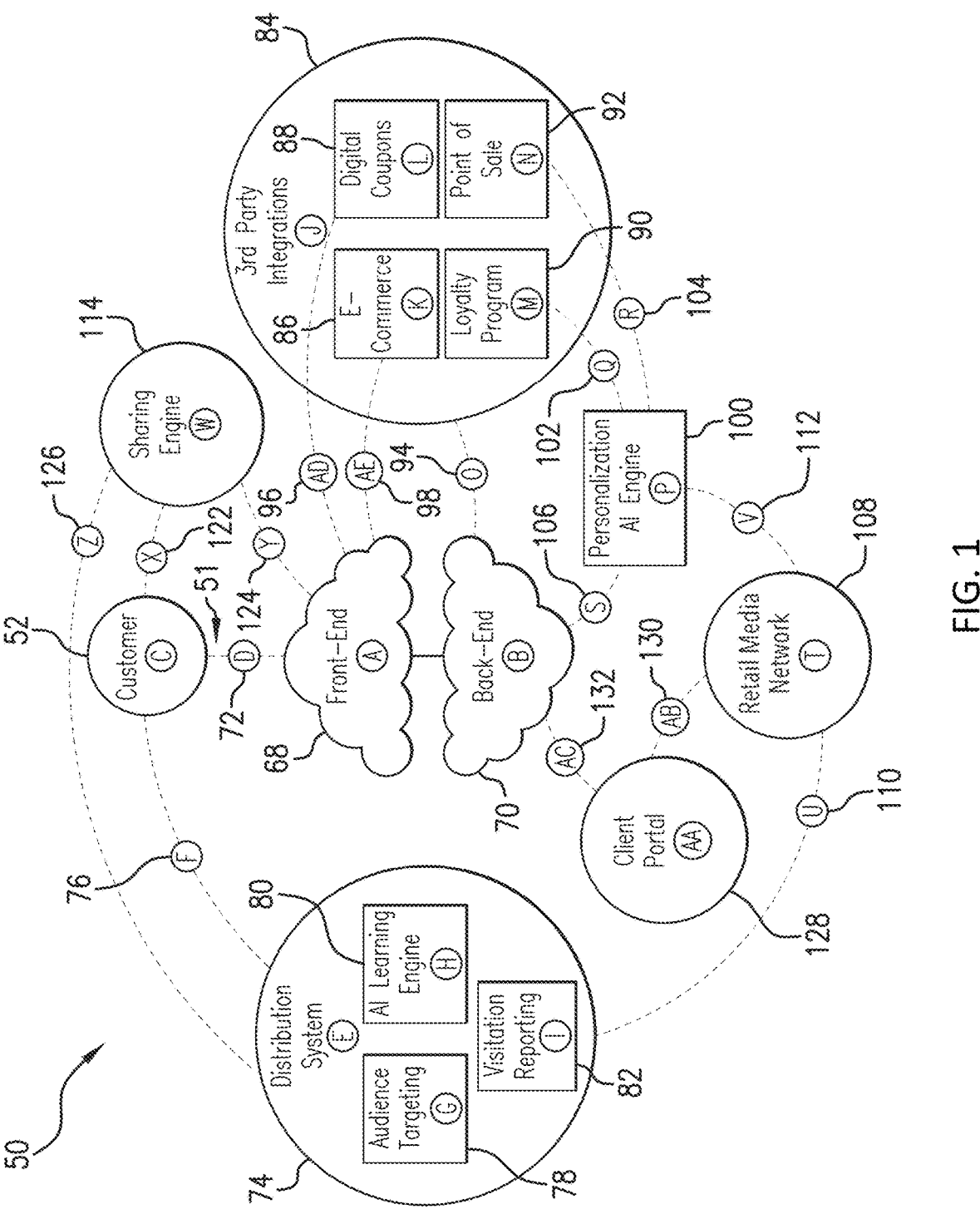
FIG. 1 illustrates aspects of an embodiment of a dynamic digital advertising content system (DDACS).

Embodiments of the disclosure generally relate to enabling a user (e.g., a customer of a retailer or customer of a competitive retailer) to view a digital circular that is dynamically arranged for display on a communications device of a user. Moreover, embodiments of the disclosure relate to a retail media network that can enable the circular content items of the digital circular to be dynamically arranged in a rank configuration such that certain selected content items can be selectively presented at more visually prominent, or primary, positions than other content items, which may instead be positioned at secondary positions in the digital circular. Such a rank configuration of the content items can be generated, at least in part, in response to an inputted selection at a dynamic retail media network communication device by the user, and can correspond to one or more vendor parameters that can be associated with one or more digital advertisements.

Embodiments of the disclosure also generally relate to enabling an identification of compound return with respect to benefits a vendor in the digital circular may indirectly receive as a consequence of the content items of at least one other vendor in the digital circular. For example, embodiments can relate to tracking impressions of circular content item(s) a first vendor receives by first users viewing the digital circular. According to certain embodiments, a direct return on those impressions for that first vendor can be tracked in the form of tracking purchases from the retailer of the products of the first vendor, and/or visits or traffic to the store of the retailer made by the first users. Additionally, impressions by other, or second, users of other content items associated with one or more second vendors can also be recorded. The subsequent purchases of the products of the first user from the retailer and/or associated visits or traffic to the store of the retailer by the second users can be tracked. Such tracking of the second users can provide an indication of the benefit the first vender indirectly received from inclusion in the digital circular via the content items of the one or more second vendor(s), which can also be referred to as a compound return.

The following description refers to the accompanying drawings that illustrate exemplary embodiments. Other embodiments are possible, and modifications can be made to the embodiments within the spirit and scope of this description. Those skilled in the art with access to the teachings provided herein will recognize additional modifications, applications, and embodiments within the scope thereof and additional fields in which embodiments would be of significant utility. Therefore, the description is not meant to limit the embodiments described below.

In the description, references to "one embodiment," an "embodiment," and "example embodiment," etc., indicate that the embodiment described may include a particular feature, structure, or characteristic, by every embodiment may not necessarily include the particular feature, structure, or characteristic. Moreover, such phrases are not necessarily referring to the same embodiment. Further, when a particular feature, structure, or characteristic may be described in connection with an embodiment, it may be submitted that it may be within the knowledge of one skilled in art to affect such feature, structure, or characteristic in connection with other embodiments whether or not explicitly described.

FIG. 1 illustrates aspects of an embodiment of a dynamic digital advertising content system or digital circular generation system ("DDACS") 50, including a relationship between a user 52 and a retailer/client. The user 52 can be any person, user, organization, and/or entity, among others, that may be interested in perusing and/or purchasing products, goods, and/or services (collectively referred to herein as "product" or "products") of a vendor that are offered by, and/or through, the retailer/client. The retailer/client can be a person, organization, entity, business, seller, merchant, store, store chain, and/or franchise, among other entities, that is/are offering a product(s) for sale. As used herein, the term "retailer" or "client" can be used interchangeably as the terms can refer to a business or other organization engaged in the business of promoting and/or selling the product(s) of a vendor to the user 52. As used herein, the term "vendor" can correspond to an individual or entity that provides or supplies products to the retailer for sale. Thus, for example, the term "vendor" can include, but is not limited to, manufacturers, distributors, wholesalers, intermediaries, and agents, among other types of suppliers of products. As also discussed below, the DDACS 50 can also be operable to accommodate communications and engagement with/by the vendor or other third party participants other than the user 52 and retailer, including, for example, third party participants such as digital coupon providers and/or loyalty program providers, among others.

The DDACS 50 is adapted to accommodate generation of a digital circular that is customizable at least at an individual store, franchisee, and/or retailer specific level, as well as also be customizable among groups within an entity or organization and/or the entire entity or organization. The DDACS 50 can also be dynamic in at least terms of the arrangement and/or presentation of information, including product content items, in the digital circular in response to retailer and/or user 52 decisions and/or selections. As further discussed below, according to certain embodiments, the DDACS 50 can dynamically arrange the digital circular in various rank configurations such that certain content items can be selectively presented at more visually prominent positions than other content items in response to a particular selection of made by a user. According to certain embodiments, the rank configurations can correspond to a particular link and/or advertisement selected by a user via use of a dynamic retail media network communications device. Additionally, as discussed below, rank configurations can be based on media campaigns, including targeted media companies, that may be promoting the product(s) of one or more vendors, alone or in combination with promoting an associated retailer. Moreover, such rank configurations can be based on a selection of one or more co-branded promotions from a plurality of co-branded promotion, each co-branded promotion involving one or more retailers and one or more vendors.

Such engagement with the DDACS 50 by a user 52, retailer, and/or third party, including via the inputting of information and/or responses into the DDACS 50, can occur in via use of a dynamic retail media network communications device, including via use of user interfaces provide by, or communicatively coupled to, a dynamic retail media network communications or computing devices. Moreover, a retailer, consumer 52, vendor, and/or third party can be able to engage with the DDACS 50 via use of a variety of different types of dynamic retail media network communications or computing devices, including personal computing devices, such as a desktop computer, laptop, tablet, smart phone, and/or mobile or cellular device, among other communication or computing devices.

According to certain embodiments, the DDACS 50 includes at least a front end system 68 and a back end system 70. The back end system 70 system complements the front end system 68 system and likewise includes at least one processor and a memory coupled with the processor, the memory including instructions that cause the processor to process content related to the digital circular based on information, including, but not limited to, a particular uniform resource locator (URL), a uniform resource identifier (URI), or other signal, received by the DDACS 50 in response to a user selection or other action inputted via the user into an input interface of a dynamic retail media network communication device. In response, the DDACS 50 can process content information on the back end system 70 at least in a manner that can arrange the order in which vendor products are to be displayed by the front end system 68 in accordance in a rank configuration associated with the information received by the DDACS 50 corresponding to the user selection.

The front end system 68 can include instructions for the display of product content items for various vendors in the ranked configuration, among other information regarding an associated retailer, on a user interface of the dynamic retail media network communications device. Moreover, as discussed below in more detail, the front end system 68, or the back end system 70, can be utilized to generate and/or transmit product information for different vendors in the form of a digital circular having the various product information arranged in a ranked configuration for presentation on the dynamic retail media network communications device of the user 52, and/or for engagement with the user 52. Additionally, the front end system 68 can receive inputs, such as, for example, selections, made by the user 52 via a user interface or input device of the dynamic retail media network communications device. According to certain embodiments, the front end system 68 is, or includes, a graphical user interface of a website that permits interaction by a user 52 with content items published by the retailer via the DDACS 50. Additionally, or alternatively, the front end system 68 is a website of a retailer, including, but not limited to, a single retailer, or plurality of retailers that may, or may not, be different branches or franchisees that may be related or unrelated to a common parent organization or entity. Further, as discussed below, the front end system 68 of the DDACS 50 can be a website to which a dynamic retail media network communications device of a user 50 be taken to, or otherwise driven to, in response to a selection made by the user 52. For example, the dynamic retail media network communications device of a user 50 can be brought into communication with, or otherwise connected or redirected to, the DDACS 50 in response to the user 52 selecting, via the dynamic retail media network communications device, a hyperlink, banner, or other advertisement that may be presented at a third party website, electronic communication, or application program or software application ("app.").

Various functions of, and interactions between, the front end system 68 and the back end system 70 are contemplated, including those related to various other entities/engines/ networks. In some embodiments, the various entities/engines/networks can exist separate from the front end system 68 and/or back end system 70, but in some forms can be integrated therewith. Continuing with a few other examples, the back end system 70 can include a portal through which a client (e.g., a retailer) uploads configuration information used by the back end system 70 to determine the layout of the digital circular. Additionally, or alternatively, the back end system 70 can include a portal through which a vendor can upload product content. The back end system 70 can also include a portal at which either, or both, a retailer or a vendor can upload information relating to advertisement of, or promotional activities for, one or more products of the vendor. The back end system 70 can also include and/or be integrated with a personalization AI engine useful to ingest user information, and/or information for one or more groups of users, including, but not limited to, information regarding digital circular viewing habits or tendencies, purchases of a product or collection of related or unrelated products, locations of purchases, user characteristics or data, and/or geo-tracking information, among other information, to provide a customized digital circular. Various other entities/engines/ networks are described in greater detail further below.

In at least some instances, communications between the user 52, and moreover a dynamic retail media network communications device of the user 52, and the front end system 68 can occur via a channel 72. According to certain embodiments, the channel 72 can accommodate information from the front end system 68 being provided to the user 52 in the form of an on-line content, such as, for example, in the form of a website and/or software application ("app.") that is accessible by the consumer 52, and which permits consumer interaction with content published by the retailer through the DDACS 50. As will be appreciated, the website utilized with/for the channel 72 can be rendered either on the front end system 68 or back end system 70, and in some forms can use isomorphic rendering with a render on the back end system 70 first and on the front end system 68 thereafter.

The channel 72 can be configured to accommodate communication between a dynamic retail media network communications device of a user 52 and the front end system 68 using any suitable type of wired and/or wireless connection, as well as via any suitable type of communication protocol, telecommunications hardware, and associated software. Thus, the channel 72 can be, but is not limited to, an internet enabled communication, a wireless connection (e.g., Wi-Fi, Bluetooth and, cellular, etc.), or a wireline connection (e.g., utilizes infrastructure delivering telecommunications to residences and or buildings). In short, any suitable digital medium through which a dynamic retail media network communications device of the user 52 can interact with the front end system 68 and view content items related to the digital circulars described herein is contemplated. The dynamic retail media network communications devices of users 52 may also interact with the DDACS 50 through a retailer's native software application, a downloaded Progressive Web App (PWA), or via a retailer's website, including, but not limited to, a webpage or link to the DDACS 50 that is embedded directly on the retailer's website.

The back end system 70 can generally be configured to accommodate input and/or content from a specific, or individual, retailer and/or vendor with respect to at least products or services that can be presented in the digital circular. According to certain embodiments, the back end system 70 is a web-based software platform that can provide content management access for retailer websites and/or various vendor related promotions, including, for example, content management can be performed by the retailer(s), vendor(s), and/or third parties. Further, the back end system 70 can be utilized for prioritizing the products that are to be presented in the digital circular, including, for example, with respect to promotional advertisements for the products of one or more vendors, and/or the timing or duration at which specific products can be presented in the digital circular, among other features. According to certain embodiments, a client portal 128 can be provided that provides retailers and/or vendors access to the back end system 70 via a channel 132. Such a portal 128 can, for example, be a web-based software platform that is accessible to a retailer, vendor, or other operator via a dynamic retail media network computing device.

The connection 132 between the client portal 128 and the back end system 70 can provide direct control over content management within the back end system 70. Thus, each retailer or vendor can have retailer specific, or vendor specific, credentials, respectively, that can allow the retailer or vendor to at least access the back end system 70, and which may be utilized to access other features of the system 50, including the below discussed retail media network 108. Accordingly, access to the back end system 70 via the client portal 128 can also involve satisfaction of certain security measures, such as, for example, a password and/or two factor authentication. Additionally, permissions can be enabled to provide users of the back end system 70 control over different areas of the associated website for that particular retailer, including control over portions of the website that may be accessible to customers 52 via the front end system 68.

Retailers and/or vendors can, via the client portal 128 and associated channel 132, provide or otherwise input a variety of information regarding a plurality of products to the back end system 70. Thus, for example, according to certain embodiments, the back end system 70 can comprise a database, data store, or other storage means. The manner in which product information can be provided, stored, edited, and/or removed by a retailer and/or vendor to/from the back end system 70 can vary. For example, according to certain embodiments, the back end system 70 can maintain a listing, such as, for example, a spreadsheet, table, database, datastore, among other manners of recording information regarding products. It will be appreciated that other types of data encapsulation and transfer to the back end system 70 are contemplated, such as, but not limited to serialization of the data and transfer via API calls. Additionally, or alternatively, individual retailers and/or vendors can, via use of the client portal 128, upload information to the back end system 70, such as, for example, upload a spreadsheet file containing text and artwork, among other product content, for one or more products. Further, data can be uploaded to the back end system 70 in a variety of other, or additional, manners, including, but not limited to, via a dynamic connection between the back end system 70 and one or more databases of the retailer(s), including, but not limited to, back office software, point of sales, and/or e-commerce systems, among other measures of data storage, as well as combinations thereof. Such a configuration can accommodate the uploading of relatively large amounts of information by the retailer to the back end system 70. Further, in addition to, or in lieu of, individual stores uploading information, the back end system 70 can also include nodes that can accommodate the uploading of product content that can be shared by different retailers, including, for example, shared by different branches or franchisees that may be related to a common parent organization or entity. In some embodiments, the back end system 70 can be configured to create store groups which are useful to create efficiency in content management. The store groups can provide nodes where content can be uploaded for stores that share like content. Accordingly, the back end system 70 can be utilized to archive and organize data related to a digital circular, including, for example, information related to product, value/pricing, promotional start and stop dates, among other data.

Figures 2A, 2B:
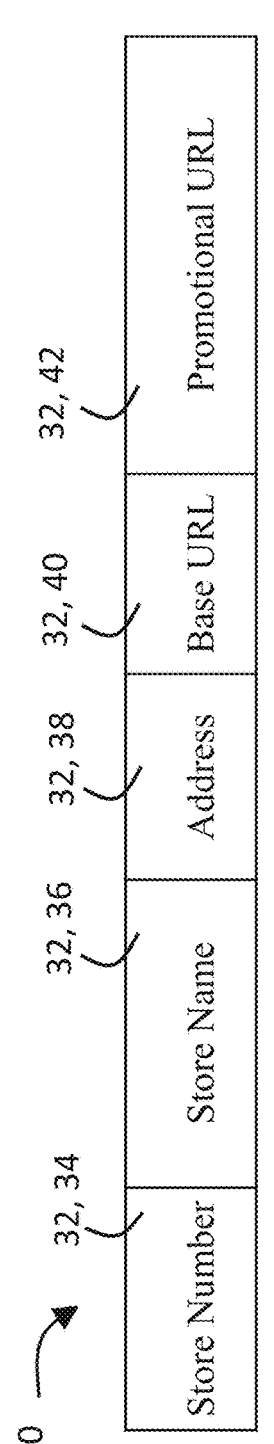
FIG. 2A illustrates an exemplary table containing product content and digital circular display information for the associated products that can be maintained at a back end system of the DDACS.
FIG. 2B illustrates an exemplary heading for a table that can be maintained at a back end system of the DDACS that can contain retailer information, including base webpage addresses and web addresses associated with digital circulars that are specifically arranged to prominently display particular, select products.

A non-limiting example of information that can be provided or uploaded to the back end system 70 is shown by the exemplary spreadsheet or table 20 shown in FIG. 2A. While FIG. 2A illustrates an exemplary use of a spreadsheet 20, as discussed above, information can be provided to the back end system 70 in a variety of other manners, including, but not limited to, via a dynamic connection, database entry, etc. As seen by the exemplary spreadsheet or table 20 depicted in FIG. 2A, according to such embodiment, such a spreadsheet 20 can include either rows or columns that correspond to a product(s), and the other of the rows or columns can relate to characteristics, features, and/or sales for the products. For example, referencing the example shown in FIG. 2A, according to certain embodiments, each row in the spreadsheet 20 can correspond to a different product (e.g., Product #1, Product #2, etc.), and the columns of the spreadsheet 20 can correspond to features or characteristics relating to the product and/or the sale of the product. Thus, in such an example, for each product, there may be one or more product descriptor categories 22, one or more product sales categories 24, and/or one or more product display categories 26. In some embodiments, each product or service offered or provided by a vendor can be associated with a unique product identifier ("Product ID"), which can be used by the DDACS 50 to, among other things, generate digital circulars, generate or arrange item cards containing content associated with each product, facilitate data sharing, determine metrics, and/or prepare reporting data.

Product descriptor categories 22 can include, but are not limited to, an indication of a category to which the product can be grouped (e.g., meat, candy, dairy, cleaning supply, pastry, beverage, etc.), brand name, manufacturer, product size, and/or product quantities, among other characteristics or features of the product. With respect to at least the category to which the product can be grouped, group options available for selection when entering a particular product into the table can be predetermined.

The one or more product sales categories 24 can include, for example, the sale price of the product, product discount or rebate information, and start and end dates for a sale of the product is to be available for display on the circular that is to be generated by the DDACS 50.

The one or more product display categories 26 can include an indication, or location, of the artwork that is to be used, if any, for the particular product in the circular, a size in a digital circular grid for the digital circular that the information regarding the product including artwork, is to occupy in a digital circular grid for the digital circular, and whether the product is to be hidden with at least a first level of the circular. According to certain embodiments, the product display categories 26 can also include dates and/or time durations that the particular product is to be, or can be, displayed in the circular. The artwork for each product can correspond to a static image, animation, and/or video that can be stored by the back end system 70 and/or accessible or retrievable from a third party service. Examples of animations can include a looping animation. Animations shown for associated products in the digital circular can play automatically when the user 52 scrolls to a location of the digital circular at which the product is shown in the display of the user dynamic retail media network communications device. It will be appreciated that animations can included not only moving images, but also relevant product details such as product name and/or price, among other information. In some forms, the animation may run in the background while relevant product details remain in the foreground. To enable the animation, a user such as the retailer can upload the animation to the back end system 70, or the back end system 70 can be configured to extract a looped animation from a larger video. For example, according to certain embodiments, the artwork can correspond to a link to a video that is accessible via use of the YouTube™ Data application programming interface (API).

Additionally, as discussed below, the information from one or more of the product descriptor categories 22, product sales categories 24, and/or product display categories 26, as well as information provided by those categories 22, 24, 26 can be utilized to prioritize which product content items are to be displayed in the digital circular, and/or assist in the ordering and positioning of content items for different products in a digital circular grid of the digital circular.

Another non-limiting example of information that can be provided or uploaded to the back end system 70 is shown by the exemplary header 30 shown in FIG. 2B for a spreadsheet or table. While FIG. 2B illustrates an exemplary header 30 for use with a spreadsheet, as discussed above, information can be provided to the back end system 70 in a variety of other manners, including, but not limited to, via a dynamic connection. As seen by the exemplary header 30 depicted in FIG. 2B, according to such embodiment, the header 30 can be used with a spreadsheet that can include either rows or columns that correspond to a plurality of retailers, which may, or may not, be related to the same entity(ies) and/or franchises. As seen in FIG. 2B, according to such an embodiment, the header 30 can be arranged for different retailers to be identified on each row of the table or spreadsheet In some embodiments, each retailer can be assigned a unique retailer identifier ("Retailer ID"), which can be used by the DDACS 50 and the other systems disclosed herein (e.g., the dynamic retail media network system 200) to provide some or all of the functionality described herein. Moreover, in the illustrated embodiment shown in FIG. 2B, the header 30 is configured to utilize a plurality of identifiers 32 to identify each retailer on a store level. Thus, in this example, each store for the associated retailer(s) can be identified based on a store number 34 or a store identifier ("Store ID"), which may be a number that may, or may not be unique to the DDACS 50 or to the associated retailer. In some embodiments, other identifiers 32 such as, for example, the name of the store 36, an associated mailing address 38, and/or a base URL 40, as well as various combinations thereof can be used by the DDACS 50 and the other systems disclosed herein to identify, or facilitate identification of, an individual store of a particular retailer. The base URL 40 can, according to certain embodiments, correspond to a web page of the associated store identified in the same row of the spreadsheet or table, such as, for example, a home page of a web site for the store(s) of the retailer. It should be appreciated that, in some embodiments, one or more of the identifiers 32, or any of the other information described with reference to FIGS. 2A and 2B, may be stored in a database or any other suitable datastore or format rather than a spreadsheet or table.

In some embodiments, additional identifiers can be used by the DDACS 50 to provide some or all of the functionality described herein. For example, in some embodiments, each vendor can be associated with unique vendor identifier ("Vendor ID"). In instances where a particular vendor provides or offers products or services associated with more than one brand, each brand can be associated with a unique brand identifier ("Brand ID").

As discussed herein, the digital circulars generated by the DDACS 50 and the other systems disclosed herein (e.g., the dynamic retail media network system 200) may include one or more item cards. These item cards may depict, show, or otherwise include content relating to a retailer, a vendor, a product, a promotion, or any other type of information for display to a user or customer 52. For example, in some embodiments, the DDACS 50 and the other systems disclosed herein (e.g., the dynamic retail media network system 200) may generate a digital circular containing a plurality of items cards where each item card includes information relating to a product being sold by a retailer (e.g., a product description, price, digital artwork, etc.). In such embodiments, each item card may be associated with a unique card identifier ("Card ID"), which may be used by DDACS 50 and the similarly disclosed systems to, among other things, generate digital circulars, generate or arrange item cards containing content associated with each product, facilitate data sharing, determine metrics, and/or prepare reporting data.

It should be appreciated that one or more of the identifiers 32 utilized by the DDACS 50 may associated or linked with one or more other identifiers 32. For example, a particular retailer may have multiple stores or locations and, as a result, the Store ID of each store or location may be linked to the Retailer ID of that retailer by the DDACS 50 and the similarly disclosed systems. In another example, a particular vendor may provide products for multiple different brands. In such cases, the DDACS 50 and the similarly disclosed systems may link the Brand ID for each brand to the Vendor ID of the corresponding vendor. In a further example, a particular brand may provide or offer multiple products under the same brand name. In such cases, the DDACS 50 and the similarly disclosed systems may link the Product ID of each product to the same Brand ID. In yet another example, the DDACS 50 may link the Product ID of one product provided by one vendor to the Product ID of another product provided by a different vendor. Card IDs may also be linked in other embodiments. For example, in some embodiments, a Card ID associated with an item card containing one piece of content (e.g., a recipe, a product, a promotion, etc.) can be linked or otherwise associated with the Card ID of a different item card or another identifier. It should be appreciated that such linking of identifiers advantageously groups different content items together.

As also indicated by FIG. 2B, for each row entry, a promotional URL 42 can be identified. As discussed below in more detail, the promotional URL 42 can correspond to a particular arrangement of a digital circular for the corresponding store of the retailer that may be associated with a particular promotion or advertisement. For example, first row entry for a store of a retailer can include a first promotional URL 42 that can correspond to a webpage displaying a first digital circular, the first digital circular being specifically arranged such that first content items for a first product from a first vendor associated with a first promotion or advertisement seen by a customer is displayed at a more prominent position in the first digital circular than content items for other products and/or products from other vendors. Such prominent positioning can take a variety of forms, including, for example, positioning at a top and/or front position of the digital circular.

While the above-example is discussed in terms of a first promotion, embodiments of the subject application is adaptable for use with multiple, at least partially simultaneous promotions, each promotion involving a different advertisement or promotion, including promotions for different products and/or different products from different vendors. Thus, according to certain embodiments, for each promotion, the table, or another table, associated with the exemplary header 30 or a similar header 30 can have other row entries for the same retailer or store of the retailer wherein the identifiers 32 may be the same or similar with at least the exception of the promotional URL 42.

Thus, continuing with the prior example involving the first promotional URL 42 in the first row entry, the associated table, or another table, can include, for the same store or retailer identified in the first row entry, a second row entry that is similar to the first row entry but has a different, or second, promotional URL 42. Thus, in this example, while the first promotional URL 42 in the first row entry corresponds to a promotion or advertisement of a first product from a first vendor, the second promotional URL 42 of the second row entry can correspond to a promotion or advertisement of a second product from a second vendor, the second product being different than the first product and/or the second vendor being different than the first vendor. In such an example, the second promotional URL 42 can correspond to a webpage displaying a second digital circular, the second digital circular being specifically arranged such that the content items for the second product from the second vendor associated with the second promotion or advertisement seen by a customer is displayed at a prominent position in the second digital circular. Moreover, in such an example, the second digital circular can be generally the same as the first digital circular, but have different arrangements at least in terms of the arrangement and/or order of content items in the digital circular.

In some embodiments, the promotional URL 42 may include digital circular arrangement data indicative of how the DDACS 50 and the similarly disclosed systems (e.g., the dynamic retail media network system 200) should arrange one or more of the item cards of the digital circular to be generated. This digital circular arrangement data may be in the form of one or more identifiers or a string of characters combined with or included within the promotional URL 42. For example, in some embodiments, the Product ID of a particular product, or a Card ID associated with a particular product, may be included with the Promotional URL 42, and, in response to a user 52 attempting to access that promotional URL 42, the DDACS 50 and the similarly disclosed systems may be configured to arrange the item cards to be included in the digital circular in such a way that the item card associated with the product is located in a prominent position (or in any other desired position) of the generated digital circular. Additionally or alternatively, the digital circular arrangement data included with the promotional URL 42 can be used by the DDACS 50 and the similarly disclosed systems to determine a group of item cards (and thereby the corresponding products or content) to be included in the digital circular and/or to determine how to arrange each of the items cards of a group of item cards to be included in the digital circular. It should be appreciated that in some embodiments, digital circular arrangement data can also be combined with or included with the base URL 40.

Figure 4:
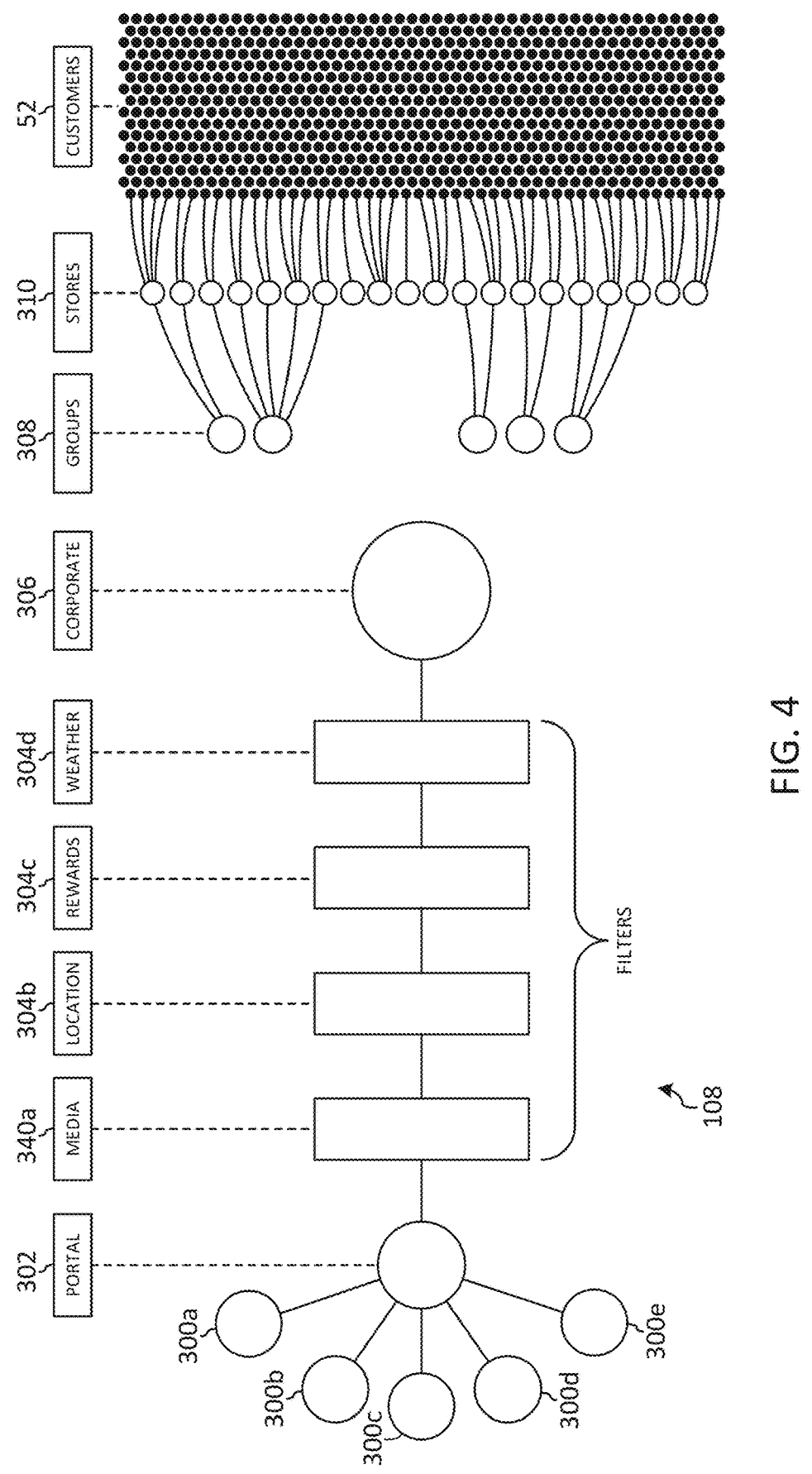
FIG. 4 illustrates an embodiment of an exemplary retail media network.

Referencing FIGS. 1 and 4, according to certain embodiments, the DDACS 50 can also include a retail media network 108. The retail media network 108 can be configured to assist retailers with connecting advertising partners, including a plurality of different vendors 300a-e, with placement in the front end system 68, including with respect to placement in the digital circular, and/or targeted digital media campaigns. Moreover, the retail medial network 108 can provide a web-based portal 302, as seen in FIG. 4 that can be directly accessed by vendors 300a-e so that those vendors 300a-e can initiate a media buy within the front end system 68 and/or in a distribution system 74. The web-based portal 302 of the retail media network 108 can also be used to communicate the details of the product content that such vendors 300a-e would like to publish in one more digital circulars, as well as be used to upload related artwork that may be utilized by the back end system 70. According to certain embodiments, the web-based portal 302 can be connected to the retail media network 108 via a connection 130 that can enable vendors 300a-c access to the retail media network 108 using their portal credentials.

The retail media network 108 can also utilize one or more media filters 304a-d, which can include personality profiles of one or more customers 52 or groups of customers 52 of a retailer. According to certain embodiments, the media filters 304a-d utilized can be based, at least in part, on input from the vendors 300a-c. For example, in some embodiments, the retail media network 108 can utilize location filters 304b to focus media campaign and/or content management to a store 310 or set of stores 310 based on location of the store(s) 310 and/or customers 56. Additionally, or alternatively, in some forms, the retail media network 108 can utilize reward filters 304c in which personality profiles of target customers 52 can be based on rewards (loyalty) program purchase history(ies). Moreover, the filters 304a-d can be based on a variety of different types of criteria, including, but not limited to, customer 56 demographics, among other criteria.

According to certain embodiments, the distribution system 74 can also be configured to have an audience targeting system 78 that may, or may not, be utilized with the one or more media filters 304a-d. The audience targeting system 78 can be adapted to selectively direct particular product information, including advertisements, to a user 52 based on, or using, information that has been obtained for that particular user 52, and which may be stored, for example, in a database or datastore of the distribution system 74 and/or the audience targeting system 78, among other databases or datastores of the DDACS 50, For example, the audience targeting system 78 can be adapted to utilized at least location information, such as, global positioning system (GPS) information from a dynamic retail media network communications device, including mobile devices, of the user, to identify the proximity of the user 52 to specific retailers. Such proximity information can be utilized to determine the retailer website to which the user 52 is to be directed. Further, target audiences can be built using the audience targeting system 78 at a given moment in time, and/or across a time span, using one or more different measures including, or, alternatively, other than, location information for the user 52, such as, for example, online search history(ies) and credit card usage data, among other information.

As also seen in FIG. 4, to aid in at least efficient management of digital content that can received by the back end system 70, and/or published by the front end system 68, the retail media network 108 can be organized by groups 308. Such groups 308 can correspond to a collection of stores 310 that may part of a larger organization or corporation 306, and which serve and/or have at least digital interactions with customers 52. Moreover, according to certain embodiments, the stores 310 in FIG. 4 can represent individual websites of individual retailers or stores or retailers, including, for example, a unique website for each retailer. According to such embodiments, the customers 52 shown in FIG. 4 can represent all views or viewers of the "stores," or the retailer websites, including websites corresponding to the base URL 40 discussed above with respect to FIG. 2B.

The distribution system 74 can be configured to drive user 52, or virtual traffic, to the on-line content provided by the front end system 68, and more specifically, to the website(s) associated with individual retailer(s), including websites associated with the above-discussed base URL 40 and/or promotional URL 42, and, moreover, to an associated digital circular having a particular arrangement of product content items. The distribution system 74 can be adapted to utilize a variety of different tactics or approaches to drive customers to such on-line content, including, for example, via targeted media buys. For example, the distribution system 74 can place ads in certain, or targeted, software applications or websites. According to certain embodiments, such targeted media buys can correspond to co-branded advertisements in which the media buy combines advertisements from at least two different entities, including, for example, an advertisement identifying both a retailer and products of one or more vendors, as discussed below in more detail. In response to consumer 52 interaction with such ads, such as via user engagement with the user interface of a dynamic retail media network communications device, the consumer 52 can be taken to the retailer specific website, and, moreover, the website that for a specific, individual retailer or store. As discussed below, such user engagement can include the user selecting, including clicking, on an advertisement at a website of the retailer or a third party website that directs the dynamic retail media network communications device to a website, and, moreover, a digital circular, associated with the above-mentioned promotional URL 42 and/or the base URL 40.

The distribution system 74 can also be configured to interact with the consumer 52 via an information pipeline 76. For example, users 52 can interact with the distribution system 74 by engaging with certain types of online content, such as, for example, interacting with on-line advertising that may be in the form of websites, results from an on-line search, connected home devices, and/or software applications, among other online content. For example, while engaging with the distribution system 74, the user 52 may see and engage with an advertisement from/for a retailer, at which point the user 52 is driven through channel 72 to connect with the front end system 68. Again, such connections can, according to certain embodiments, involve the dynamic retail media network communications device of the user 52 being taken to a website, and, moreover, a digital circular, associated with the above-mentioned promotional URL 42 and/or the base URL 40.

The distribution system 74 can also be configured to include a visitation reporting system 82. The visitation reporting system 82 can be configured to monitor, and/or record within a database or datastore of the visitation reporting system 82, information regarding interaction of users 52 with targeted digital media ads of a particular retailer, and moreover, a website for that particular, or individual, retailer. The visitation reporting system 82 can be further adapted to detect, such as, for example, via location tracking, including geo-tracking, of a dynamic retail media network communications device of the user 52, a subsequent physical presence of the user 52 at that particular retailer, such as, for example, at a brick-and-mortar retail location of that particular retailer. Information regarding the monitoring of user interaction with a particular retailer's website, and subsequent detection of the physical presence of the user 52 at the retailer, as indicated through the location of a dynamic retail media network communications device of the user 52 at the retailer, can be recorded in a visitation report in a database or datastore of the visitation reporting system 82, among other portions of the of the distribution system 74 and/or DDACS 50.

Data from such visitation reporting can be used for a variety of purposes and/or different types of reports. For example, such visitation reporting can permit the distribution system 74 to produce a location specific store visitation quantity, such as, for example, a total number of visits, total number of visits per user 52, and/or histograms of store visitations by hour of day, among other reporting. Information regarding visitations that is stored by the visitation reporting system 82 can also be used to determine a value associated with such the visitations. For example, according to certain embodiments, the number of user visitations for customers that interacted with the retailer's website, as provided by the DDACS 50, can be compared with associated advertising costs incurred by the retailer to derive a cost per user visit report(s) for the retailer. Such reports can, for example, provide information regarding costs per visits during certain selected time periods. Additionally, such information can also provide a variety of other customer analytics, such as, for example, the percentage of users 52 who interact with the retailer's website that then visited the retailer's location and are new, repeat, and/or relatively long term absentee customers in terms of either, or both, visiting the website and/or physically coming to the retailer's physical store or location.

Additionally, according to certain embodiments, visitation reporting data obtained via use of the reporting system 82 can be utilized for at least purposes of determining, for various vendors, compound return(s) on the media buy the vendor(s) associated with product(s) of the vendor being placed digital circulars. Moreover, as further discussed below, such a reporting system 82 can indicate to a vendor the benefit the vendor received in terms of a user 52 that was driven to a digital circular by an advertisement for a product(s) of another vendor(s) actually visiting the store 310 associated with that digital circular, as detected via use of the reporting system 82.

The distribution system 74 can also include an artificial intelligence (AI) engine 80. According to certain embodiments, the AI engine 80 is a neural network that can utilize recorded and/or stored information to improve the accuracy or case with which digital circulars are dynamically generated for display on a communication device of user 52. Improving the accuracy or case with which digital circulars are generated can improve the efficiency of the distribution system 74. Moreover, improving the accuracy or ease in which item content for various products and/or retailers, and more specifically, the item cards of the digital circulars that depict, show, or otherwise include item content, are ranked, positioned, arranged, and/or sized based on different vendor parameters so as to generate a plurality of differently arranged digital circulars that may include the same or similar item content but in different configurations, can improve the efficiency of the distribution system 74. Further, over time, as data relating to the arrangement and sizes of such item cards and associated digital circulars based on various vendor parameters are accumulated by at least portions of the DDACS 50, the neural network of the AI engine 80 can further refine the effectiveness in generation of digital circulars, including the arrangement and rearrangement of the item cards to generate associated vendor-specific variations of digital circular. Such improvements in refining the generation of digital circulars via use of a neural network of the AI learning engine 80 can result in an improvement in the efficiency of at least the distribution system 74, including, for example, with respect to reducing the cost associated with generating numerous digital circulars for a plurality of retailers at store, group, and/or location specific levels for a plurality of products of a plurality of vendors that can being running a plurality of different marketing, advertising, or promotional campaigns. Moreover, given the associated number of marking campaigns different vendors can run at various stores or franchises for different retailers during different, or overlapping, time periods and that can be divisible on individual or various group levels, and relate to a multitude of related or unrelated products, the use of a neural network of the AI learning engine 80 of the DDACS 50 can result in an improvement in the efficiency, timeliness, and cost effectiveness of managing, generating, and distributing digital circulars that can be arranged and rearranged for a multitude of vendors.

According to certain embodiments, the accumulated, or inputted, data or information from prior generation of digital circulars and the corresponding vendor parameters, as well as the number, size, and type of content items and associated item cards can be used by the AI engine 80, and, moreover, the neural network that is provided by the AI engine 80, in connection with training and/or for machine based learning of the neural network. For example, historical information regarding past digital circulars, including the associated positioning and sizes of the item cards and corresponding vendor parameters utilized in the generation of the corresponding digital circular, can be used by the neural network of the AI engine 80 in connection with, for example, a pattern analysis, as well as refinement of identified patterns. Such analysis can assist the neural network of the AI engine 80 in developing and/or refining a model for generating digital circulars. According to certain embodiments, the neural network of the AI engine 80 can apply such data and information to one or more models, and, moreover, one or more neural network algorithms, such as, but not limited to, a multilayer perceptron (MLP), a restricted Boltzmann Machine (RBM), a convolution neural network (CNN), and/or any other neural network algorithm that will be apparent to those skilled in the relevant art(s) without departing from the spirit and scope of the disclosure.

The DDACS 50, and, more specifically, the front end system 68, can also include a sharing engine 114 that can be communicatively coupled to the distribution system 74 via a connection 126, as well as communicatively coupled to the dynamic retail media network communications device of a user 52 via a connection 122. According to certain embodiments, connections with the sharing engine 114 can be made using a tool built into a browser or software application ("app.") that enables a special hyperlink, including, for example, the promotional URL 42, to be sent. Such special hyperlink can be sent in a variety of manners, including in a text message, an email, or copied by the user and pasted elsewhere. Further, as represented by the connection 124 shown in FIG. 1, according to certain embodiments, the sharing engine 114 can be built directly into a user interface that is displayed on the dynamic retail media network communications device of the user 52, thereby providing users with relatively easy access to sharing functionality.

The sharing engine 114 can be configured to permit a user 52 to share content, such as, for example, content from or corresponding to a digital circular, and in the form of a hyperlink, with another user(s) 52. The hyperlink can correspond to information provided by, or in, a digital circular. Further, such sharing of content can occur using a variety of different types of electronic communication, including, for example, via a text message and/or email, among other forms of electronic communication. As further discussed below, if a user 52 choses to share content with one or more other users 52, the shared hyperlink can contain special codes (e.g., an identifier or string of characters combined with or included within the base URL 40 or the promotional URL 42) that can direct a user to a website associated with a digital circular that is arranged in a particular manner so that certain content item(s) for certain pre-identified products and/or vendors are selectively positioned at predetermined prominent positions within the digital circular. Again, according to certain embodiments, such prominent positioning digital content can relate to the order in which the content items are arranged, ordered, or otherwise presented in the digital circular. Thus, for example, such prominent position can relate to selected content items being placed first, or before, content items for other products relating to that vendor or other vendors. Additionally, or alternatively, such prominent positioning can relate to visual positioning or location of content items in the digital circular.

As also illustrated in FIG. 1, according to certain embodiments, the DDACS 50 can further include a third party integration system 84. The third party integration system 84 can be adapted to provide an access point for third parties, including, but not limited to, vendors, to access the DDACS 50. As discussed below, such access by third parties can, for example, reduce the burden on retailers by allowing third parties to supply and/or update product, product content, and/or advertising information that is provided to the back end system 70. Such access can also allow the third parties to receive information directly or indirectly from users 52, thereby further reducing the amount of data or associated activities that retailers have to manage and/or track. By allowing the retailer to combine technical resources to streamline the management process, third party integration system 84 can provide an improved experience for the user 52.

The third party integration system 84 can be adapted to establish one or more third party integrations. For example, the exemplary embodiment depicted in FIG. 1 has four third party integrations, namely, an electronic commerce ("e-commerce") integration 86, a digital coupon integration 88, and loyalty program integration 90, and a point of sales integration 92. According to certain embodiments, all third party integrations are contemplated to communicate with the back end system 70. Alternatively, as illustrated in FIG. 1, at least certain integrations 86, 88 can, in addition to, or in lieu of, being communicatively coupled to the back end system 70, can be directly or indirectly communicatively coupled to the front end system 68, such as, for example, by communication links 94, 96, 98, while other integrations 90, 92 can be directly or indirectly communicatively coupled to the back end system end system 70 by other communication links 102, 104. The communication links 94, 96, 98, 102, 104 can take a variety of forms, including, for example, be provided by a API, file integration, file transfer protocol (FTP), extract, transform and load (ETL), or a dynamic connection, as well as combinations thereof, among others.

The e-commerce integration 86 can correspond to an integration of a retailer and/or the DDACS 50 with a vendor or other third party e-commerce provider. Such an integration can provide a vendor or third party e-commerce provider access to the DDACS to upload content to the back end system 70, including updated product information, such as, but not limited to, information including sale offerings, promotional materials, product offerings, and/or price discounts, among other information, for products from the vendor that are sold by the retailer. Allowing vendors and third party e-commerce providers to provide such information to the back end system 70, can reduce a content management burden on the retailer, particularly when the retailer would otherwise receive such updated information from a plurality of different vendors and third party e-commerce providers for a plurality of different products.

Such access to DDACS 50 by third party e-commerce providers, and, moreover, access provided by the e-commerce integration 86, can also be configured to manage the sale and/or distribution of products that are purchased by a user 52. For example, the e-commerce integration 86, among other portions of the DDACS 50, accommodates items selected for the purchase by the user 52 while using the front end system 68 to be stored in a virtual shopping cart for that user 52. The e-commerce integration 86 can accommodate, with or without the knowledge of the user 52, items or products of the e-commerce provider in the shopping that are being sold by or through the retailer to an area that is retrievable by the associated third party e-commerce provider. Such movement of products can happen automatically each time a user 52 adds an item to their shopping cart, and/or can happen manually after a user 52 has built a shopping list by and has proceed to checkout or otherwise complete the purchase of the item(s) in the shopping list of the user 52.

The digital coupon integration 88 can be adapted to allow users 52 to view digital coupon offerings from third parties, including, but not limited to, product manufacturers or distributors, including vendors, among others, directly within the front end system 68. Such coupons, and/or corresponding hyperlinks or other information, can be virtually clipped or otherwise stored to a virtual wallet of the user 52 within the front end system 68. The digital coupon integration 88 can also be configured to accommodate third parties offering such coupons, or other sales incentives, to personalize such coupons for certain users 52, groups of users 52, and/or target audiences. Additionally, or alternatively, digital coupons can be configured to be store or retailer specific, such as, for example, being specific to a particular store or retailer location.

The loyalty program integration 90 can correspond to loyalty programs offered by third parties, such as, for example, programs offered by third party manufacturers or distributors, including vendors, among others, whose products are sold by retailers of the DDACS 50. According to certain embodiments, embodiments, such loyalty program integration 90 can provide such third parties to historical information maintained by the DDACS 50, and/or maintained by the DDACS 50 for specific pre-identified retailers. Such historical information can include a purchase history of users 52 on an individual, retailer, vendor, and/or on a product basis, as well as combinations thereof. Further, the loyalty program integration 90 can accommodate retailers having access to loyalty program information that is maintained by third parties, such as, for example, points accrued in a loyalty program(s) and/or user 52 eligibility for pricing or other benefits based on certain achievements the user 52 has obtained through participation in the loyalty program(s).

The point of sales integration 92 can provide visibility into store level inventory and pricing. For example, the point of sales integration 92 can provide third parties, including vendors, with access to information, on a retailer level, related to available inventory and pricing relating to products of, or relating to, the third party that are being sold through or by the retailer. The point of sales integration 92 can also provide third parties with access to sales information, sales quantity, prices paid for products, and details regarding the particular users 52 that purchased particular products, including personal identification information and/or demographics for those users 52.

As seen in FIG. 1, at least portions of the third party integration system 84, such as, for example, the loyalty program integration 90 and/or the point of sales integration 92 can be communicatively coupled to a personalization artificial intelligence (AI) engine 100 of the DDACS 50. According to certain embodiments, the personalization AI engine 100 is part of the back end system 70. According to certain embodiments, the personalization AI engine 100 is a neural network that can utilize recorded and/or stored information to build personality profiles. Such personality profiles can relate to predictions relating to the types of product(s) a user 52, and/or users 52 having one or more particular types of identified characteristics, may, or may not, be likely to purchase, and/or the types of advertising, discounts, and/or incentives that may, or may not, generate product sales from that/those identified user(s) 52.

Such information can be utilized, for example, with respect to determining a secondary position and/or size for item cards containing item content for one or more vendors other than the vendors associated with the vendor parameters used in determining the arrangement of a generate digital circular. For example, as discussed herein, item cards displaying content items can be presented in different arrangements and/or sizes in connection with vendor parameters for different vendors. Thus, for example, as discussed herein, vendor parameters can be utilized such that one or more item cards for the particular vendor(s) associated with the vendor parameter(s) is/are positioned at a primary position(s) in the digital circular, and/or sized accordingly. Thus, the item cards associated with the item content of other vendors can be positioned at secondary positions in the digital circular, and also sized accordingly. However, using built personality profiles, the personalization AI engine 100 can determine the arrangement of item cards of those other vendors that are in secondary positions relative to the item card(s) that is/are in the primary position(s). For example, the personalization AI engine 100 can predict or identify the personality profiles of users 52 that are the target or, or have interest in, the content item(s) provided on the item card(s) positioned at the primary position(s). Using such identified users 52, the personalization AI engine 100 can further identify which content items associated with item cards shown in secondary positions may also be of particular interest to those identified users 52. Moreover, for example, the personalization AI engine 100 can identify such content items shown with item cards in secondary positions that may have a relatively higher likelihood of being purchased by those users 52, or have a higher likelihood of purchase compared to other content items displayed at secondary positions. Such information provided by the personalization AI engine 100 can then be used by the DDACS 50 in determining which secondary positioned item cards, and, moreover the associated item content(s), are to be positioned by, including around or directly follow, the item card(s) that are at the primary position(s). Thus, the personalization AI engine 100 can further assist in determining a periodization a configuration ranking of item content that is displayed at secondary positions in a manner that can further enhance the effectiveness of the digital circular.

According to certain embodiments, the accumulated, or inputted, data or information used by the neural network of the personalization AI engine 100 in developing a model(s) and/or identifying patterns, can include purchase history data, demographic information regarding the users 52 and the associated purchase history of those users 52, reward and/or loyalty program data or purchase history, and point of sale information. As seen in FIG. 1, at least a portion of information used to develop and refine the model(s) utilized by the neural network of the personalization AI engine 100, including in connection with self-learning, can be provided by the retail media network 108, the loyalty program integration 90 and/or the point of sales integration 92 of the third party integration system 84, among other portions of the back end system 70. However, the training and/or for machine based learning of the neural network of the personalization AI engine 100 can based on, or include, a variety of other types of information, including other information maintained by, or accessible to, the DDACS 50 regarding past behaviors, responses, and/or actions/inactions of users 52. Such analysis can assist the neural network of the AI engine 100 in developing and/or refining a model that can provide a prediction of characteristics of users 52 that may, or may not, be responsive to particular types of content presented in digital circulars, and, moreover, a prediction of the content to be presented in a digital circular that can successfully facilitate sale of product(s). According to certain embodiments, the neural network of the personalization AI engine 100 can apply such data and information to one or more models, and, moreover, one or more neural network algorithms, such as, but not limited to, a multilayer perceptron (MLP), a restricted Boltzmann Machine (RBM), a convolution neural network (CNN), and/or any other neural network algorithm that will be apparent to those skilled in the relevant art(s) without departing from the spirit and scope of the disclosure.

A variety of different type of communication protocols can be used in connection with the connections 102, 104, 106, 108 between the AI engine 100 with the third party integration system 84, the retail media network 108, and the back end system 70, including, for example, API, FTP ETL, and/or dynamic connections.

The ability to dynamically interact with promotional literature, such as digital circulars, can case the shopping experience for users 52 by making shopping more appealing and efficient. Embodiments of the DDACS 50 can provide users 52 with the ability to relatively rapidly call up specific retailer locations and have access to up-to-date information on promotional items being offered by that retailer. Unlike traditional printed promotional circulars, retailers will also be able to update the content and customize, for purposes of display on the digital circular, the same with graphics, including animated graphics, without the need to wait for promotional cycle frequency. Further, unlike traditional printed promotional circulars, the DDACS 50 of the subject disclosure provides the ability include embedded videos and recipes in a digital circular, which can deliver useful content to users 52. Additionally, by the DDACS 50 enabling users 52 to share content with other users 52, including individual merchandise promotions and/or embedded content, a more rapid dissemination of information between users 52 can occur.

While the DDACS 50 shown in FIG. 1 and discussed above has various features, not all embodiments of the DDACS 50 need include each element/capability/connection indicated by the various reference numerals of FIG. 1. Moreover, some embodiments may include fewer of the elements/capabilities/connections discussed above and indicated by the various reference numerals of FIG. 1.

Figure 3:
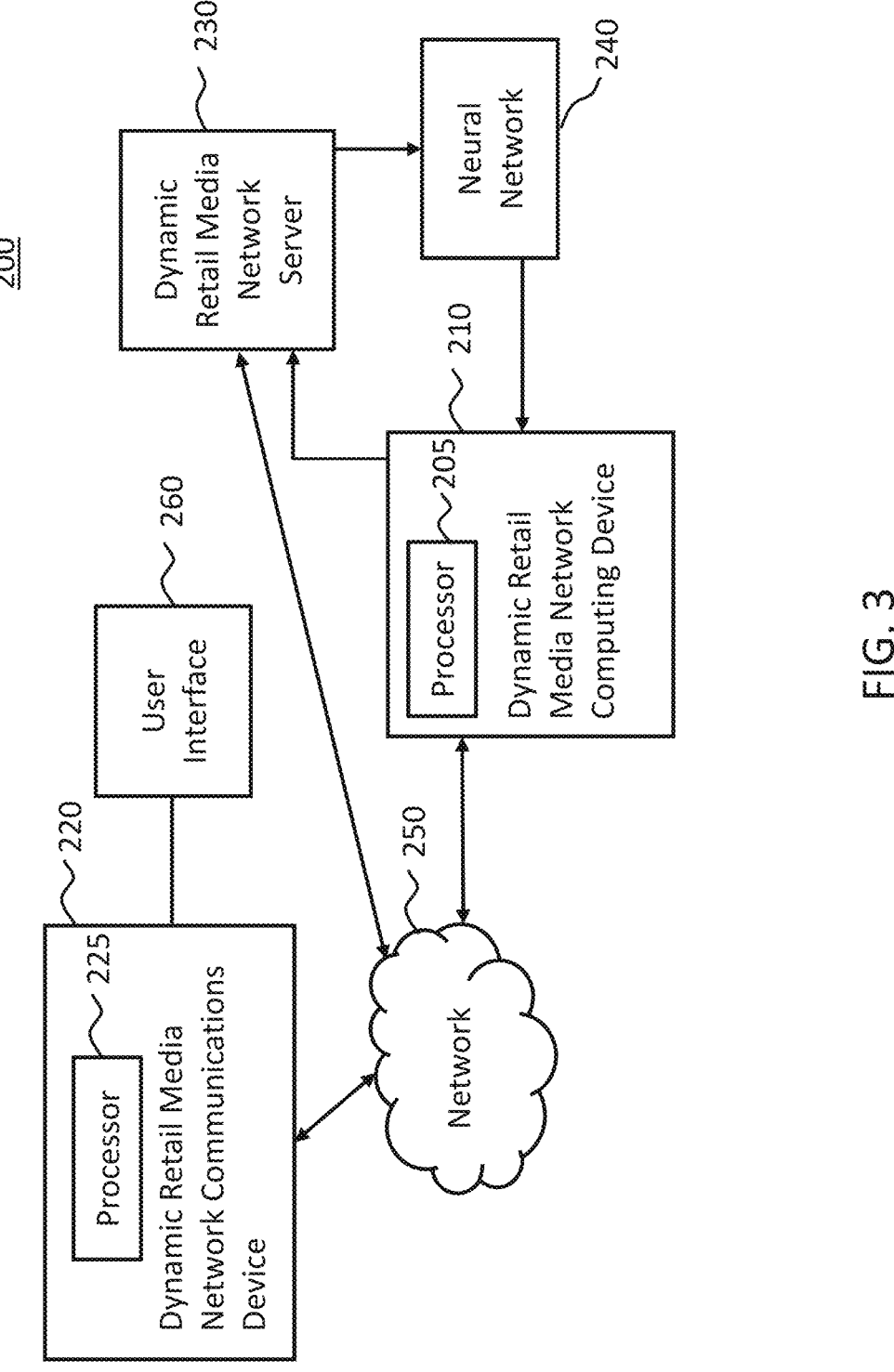
FIG. 3 illustrates a dynamic digital retail media network system that can accommodate interactions between a user and a retailer/client.

FIG. 3 illustrates an exemplary dynamic digital retail media network system 200 that can accommodate interactions between a user and a retailer/client. The digital retail media network system 200 can use several different types of dynamic retail media network computing and communication devices 210, 220 connected through any suitable network 250. The system layout 200 has many similar features as that discussed above with respect to the DDACS 50; therefore, only the differences between the system layout 200 and the DDACS 50 are to be discussed in further detail immediately below. As such, embodiments of the dynamic digital retail media network system 200 can provide any or all of the functionality of the DDACS 50 disclosed herein.

The illustrated dynamic retail media network communication device 220 of a user 52 includes one or more processors 225, a memory(ies), and a user interface 260. Moreover, the dynamic retail media network communication device 220 can be similar to the dynamic retail media network communication devices 116 discussed herein with respect to at least FIGS. 1 and 4. The user interface 260 can comprise various types of input devices and output devices, such as, for example, a screen, display, touch screen, keyboard, and/or mouse, as well as combinations thereof, among others. The dynamic retail media network communication device 220 can, for example, be in the form of a smartphone having a display or screen that can also provide the user interface 260, processor 225 structured to execute instructions, and a memory coupled to processor 225. The memory can include instructions that, when executed by the processor 225, can cause the processor 225 to receive from the user 52 a selection of at least a digital advertisement. The memory can also include instructions that, when executed by the processor 225, cause the processor 225 to be present the digital circular via the display, including a touch screen.

The system can also include a dynamic retail media network computing device 210 for the retailer 210. The dynamic retail media network computing device 210 can includes one or more processors 205, a memory(ies), and a retailer interface. Moreover, the dynamic retail media network computing device 210 can be similar to the types of computing devices discussed above, including, for example, be similar to the dynamic retail media network communication device 220.

The dynamic retail media network communication and computing devices 220, 210 are capable of interacting with each other via a network 250 and/or a dynamic retail media network server 230. In one form the dynamic retail media network server 230 is the back end system 70 depicted in FIG. 1. The dynamic retail media network communication and computing devices 220, 210 can thus be used to initiate and/or receive transmissions through the network 250.

As illustrated in FIG. 3, the dynamic retail media network server 230 can further be coupled with a neural network 240 capable of being trained using input from a retailer, vendor, or other user via the dynamic retail media network computing device 210 and/or from information obtained from the dynamic retail media network server 230 (e.g., the back end system 70) to learn user 52 behaviors using information received from the dynamic retail media network communications device 220. Additionally, or alternatively, the neural network 240 is capable of being trained using input from a retailer, vendor, or other user to assist in the generation and sizing of digital configurations based at least on associated vendor parameters. According to certain embodiments, the neural network 240 comprises one or both of the neural networks discussed above with respect to the AI engine 80 and the personalization AI engine 100.

According to certain embodiments, the dynamic retail media network communications device 220 and/or the dynamic retail media network computing device 210 can generally continuously stream item card parameters and/or vendor parameters to the dynamic retail media network server 230, which can be operated upon and/or stored in a database or datastore for further use. In doing so, the server 230 may continuously accumulate data. Over time as the data accumulated by the content server 230 continues to increase, the neural network 240, such as, for example, the previously discussed neural networks of the AI engine 80 and/or the personalization AI engine 100, may apply the data to the associated model(s), and, moreover, the one or more neural network algorithms, in connection with the continued learning of the neural network 240. Thus, as discussed above, the neural network 240 can apply such data and information to one or more models, and, moreover, one or more neural network algorithms, such as, but not limited to, a multilayer perceptron (MLP), a restricted Boltzmann Machine (RBM), a convolution neural network (CNN), and/or any other neural network algorithm that will be apparent to those skilled in the relevant art(s) without departing from the spirit and scope of the disclosure.

According to certain embodiments, each time vendor parameters are streamed to the content server 230, the neural network 240 may assist the dynamic retail media network computing device 210 by providing the dynamic retail media network computing device 210 with an appropriate adjustment with regard to the appropriate item card. Such an adjustment by the neural network 240, which may be based on, for example, on the above-discussed predictions provided by the personalization AI engine 100, can accommodate each item card, and thus the associated digital circular, being dynamically formatted, including formatted based on predictions provided by the personalization AI engine 100. Thus, such dynamic formatting can include the arrangement and/or sizing of the item cards, and thus the associated item content, that are to be presented in the digital circular.

Again, the accuracy of the predictions of the neural network 240, and the associated adjustments and/or selections for the formatting of the digital circular, can continue to improve as the neural network 240 further learns or is furthered trained using the continued accumulation of data that is provided from the front end system 68 and/or the back end system 70. The neural network 240 may assist the dynamic retail media network computing device 210 so as to improve the effectiveness and associated success of the ever changing digital circulars that are customized based on vendor parameters of different vendors.

The server 230 can include a processor, a memory, and a network interface. For example, the server 230 can include a data information system, data management system, web server, and/or file transfer server. The server 230 can also be a workstation, mobile device, computer, cluster of computers, set-top box, a cloud server or other computing device. In an embodiment, multiple modules may be implemented on the same server 230. Such a server 230 can also include software, firmware, hardware, or a combination thereof. Software may include one or more applications on an operating system. Hardware can include, but is not limited to, a processor, memory, and/or graphical user interface display.

As discussed herein, the dynamic retail media network communications device 220 is structured to respond to a user selection of one or more digital advertisements that can trigger a generation, including retrieval and/or display, of an associated digital circular that is based on vendor parameters that is associated with a retailer and the vendor(s) that is associated with the selected digital advertisement. The version of the digital circular, and, moreover, the particular arrangement of the item cards associated with the item contents of the digital circular, that is generated, including displayed and/or provided for, the user 52 can, for example, thus be based on the particular vendor and retailer associated with the digital advertisement, as well as the vendor parameters of that vendor that are used for the formatting, configuration, and/or arrangement of the corresponding digital circular. Thus, when the user 52 selects, using the dynamic retail media network communications device 220, a particular digital advertisement, a digital circular corresponding to that selected digital advertisement is displayed, via the front end system 68, to the dynamic retail media network communications device 220.

According to certain embodiments, when the user 52 makes a selection of a digital advertisement using the user interface 260 of the dynamic retail media network communications device 220, the front end system 68 can request information related to the appropriate digital circular from the back end system 70. Such a request can take the form of a request from an HTTP client using, for example, and API call. The back end system 70 can be configured to serve relevant digital circular information, including, for example, the digital circular, to the front end system 68 such as content that is stored on the back end system 70 in the form of a web page.

Figure 5:
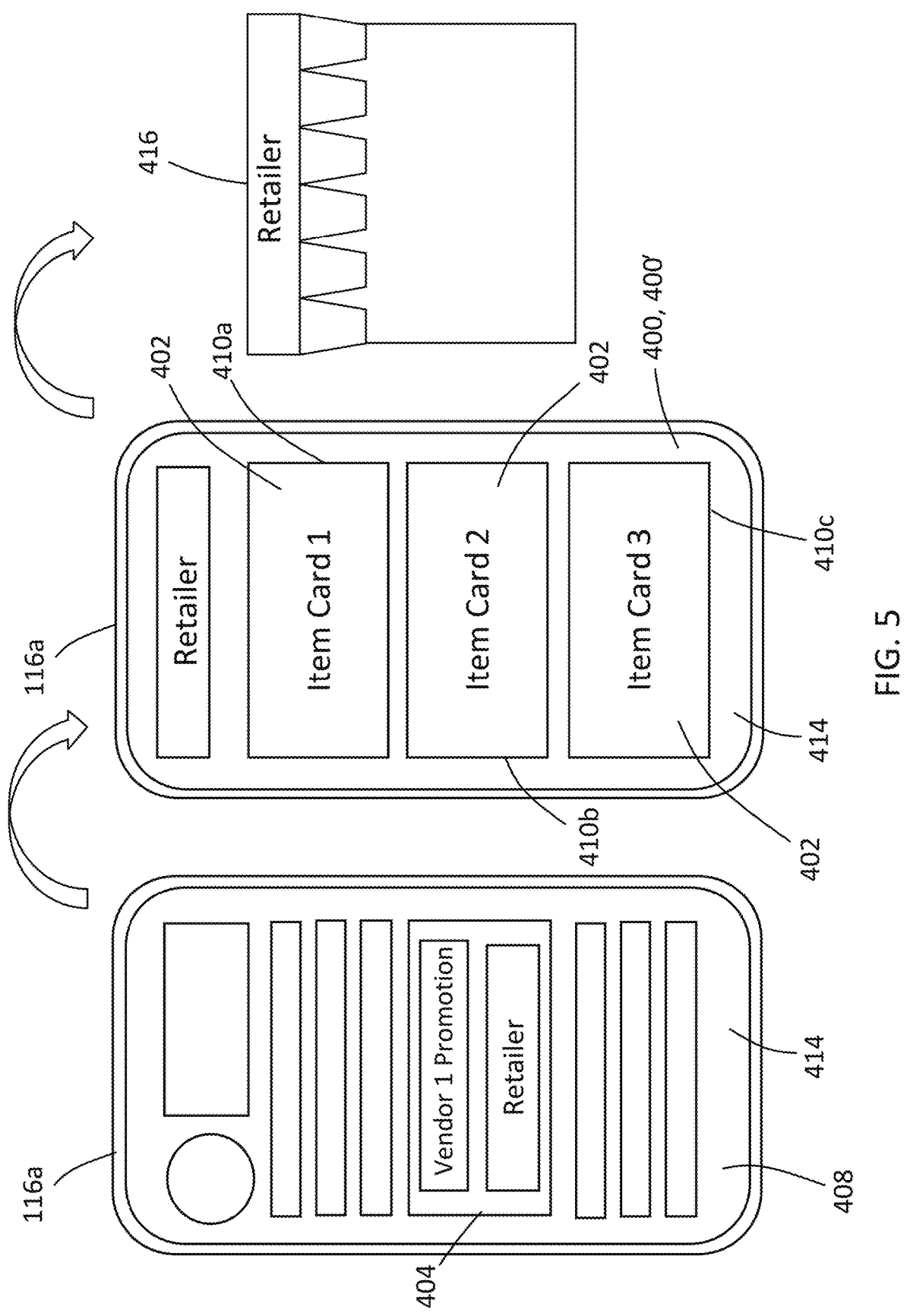
FIG. 5 illustrates an exemplary representation of a first digital circular having a ranked configuration displayed on a communication device in response to user selection of a co-branded first digital advertisement of an associated retailer and first vendor, and a subsequent visit by the user to a physical store of the retailer.
Figure 6:
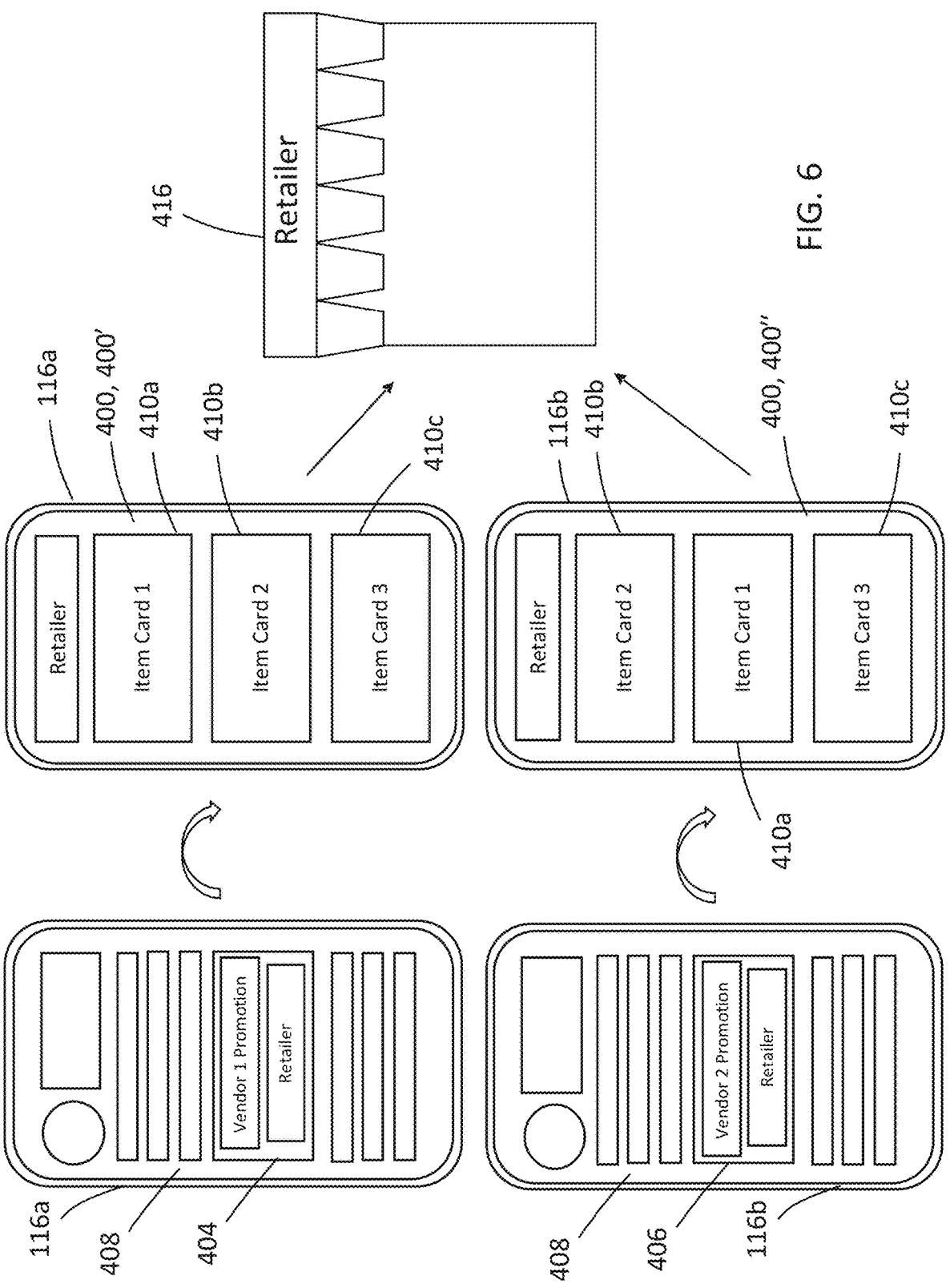
FIG. 6 illustrates an exemplary representation of first and second digital circulars having ranked configurations displayed on communication devices in response to user selections of co-branded first digital advertisements of an associated retailer and first and second vendors, respectively, subsequent visits by the users to a physical store of the retailer.

As shown in at least FIGS. 5 and 6, according to certain embodiments, the dynamic retail media network system 200 is configured for generating a digital circular 400 that is displayed to a user 52 via a communication device, such as, for example, a dynamic retail media network communication device 116a, 116b (generically referred to herein as dynamic retail media network communication device 116) based on a plurality of vendor parameters that dynamically trigger a generation and display of a plurality of circular content items 402 included in the digital circular 400 associated with a retailer. Similar to the dynamic retail media network communication device 220 discussed above with respect to FIG. 3, the dynamic retail media network communication device 116a, 116b can include at least one processor 225 coupled to a memory, and includes a user 52 interface 260. The memory can include instructions that, when executed by the processor 225 cause the processor 225 to provide access to a digital media platform associated with the retailer in response to an end user selection of a digital advertisement 404, 406 of a plurality of digital advertisements. Further, each digital advertisement 404, 406 of the plurality of advertisements can be associated with the retailer and a different vendor of a plurality of vendors that vend with the retailer.

For example, according to certain embodiments, each digital advertisement digital advertisement 404, 406 can correspond to a different co-branded marketing campaign involving the retailer and a different vendor(s). For example, FIGS. 5 and 6 illustrate an exemplary co-branded digital advertisements 404, 406 involving a retailer and vendor (generically identified as "Retailer" and "Vendor," respectively, in FIGS. 5 and 6). In the illustrated embodiment, the co-branded digital advertisement 404, 406 may be shown at least on a website 408 associated with a retailer, such as, for example, at a website 408 associated with a base URL 40 of the retailer. Additionally, or alternatively, the co-branded digital advertisement 404, 406 can be seen on a third party website 408 or software app. or another entity, among other digital locations. Thus, for example, the digital advertisement 404, 406 can be positioned on, or viewable from, a website 408 of a third party or entity for which space for the placement of the digital advertisement 404, 406 was purchased by the retailer or other entity. Therefore, according to certain embodiments, the digital advertisement 404, 406 can be a banner advertisement shown on a third party website 408 or app. Additionally, or alternatively, the digital advertisement 404, 406 can be seen on other forms of electronic communications for forums, including electronic messages such as email and texts, among others.

Further, while FIGS. 5 and 6 show generic representations for retailer "Retailer" and "Vendor," as well as item cards 410a-c, such representations can actually displayed in a variety of manners, including via stylized text, non-stylized text, graphics, numerically, photos, animations, and/or video, as well as various combinations thereof, among other manners of display and representation.

Additionally, vendor parameters associated with the vendor of the selected digital advertisement 404, 406 can be triggered to determine a position, or ranked configuration, of each item card 410a-c of a plurality of item cards 410a-c to be displayed in the digital circular 400 associated with the retailer based on the vendor parameters associated with the vendor of the selected digital advertisement 404, 406. The vendor parameters associated with the vendor of the selected digital advertisement 404, 406 can be indicative of a presentation of each item card 410a-c as displayed in the digital circular 400 of the retailer. For example, referencing FIG. 5, the vendor parameters can be based on a ranked configuration in which vendor priority is used in connection with displaying the selected item card 410a associated with that particular vendor of the selected digital advertisement 404, as compared to item cards 410b, 410c not associated with that vendor of the selected digital advertisement 404. For example, according to the embodiment shown in FIG. 5, a first displayed digital advertisement 404 selected by the user 52 can correspond to a co-branded advertisement involving a retailer and a first vendor for the retailer. In such an example, the vendor parameters associated with the selected digital advertisement 404 can relate to a position of an item card 410a associated with the first vendor is to be positioned within an associated first digital circular 400'. Moreover, in this example, such a vendor parameter can correspond to the item card 410*a* for a product(s) associated with the first vendor being positioned in the first digital circular 400' at a primary position, such as a location that is before, or above, other item cards 410*b*, 410*c* that products not associated with the first vendor, such as, for example, item cards 410*b*, 410*c* associated with vendors other than the first vendor. Moreover, such a ranked configuration can correspond to certain item cards 410*a-c*, and thus the content item(s) shown on those items cards 410*a-c*, being positioned and/or sized for placement at a primary position(s) in the digital circular in response to certain vendor parameters, while other items cards 410*a-c* and the associated content items being positioned at secondary, or less prominent, positions.

FIG. 6 illustrates another example in which different communication devices 116*a*, 116*b* show different digital advertisements 404, 406. Moreover, similar to FIG. 5, the top portion of FIG. 6 shows a communication devices 116*a* showing a first digital advertisement 404 associated with the retailer and the first vendor, and the first digital circular 400' in which the item card 410*a* associated with the first vendor is at a location that is before, or above, other item cards 410*b*, 410*c*, as discussed above. FIG. 6 also shows a second communication device 116*b* displaying a second digital advertisement 406 that is different than the first digital advertisement 404. Moreover, while in this example, the first and second digital advertisements 404, 406 with the same retailer, rather than being associate with the first vendor, the second digital advertisement 400" is associated with a different, second vendor. Thus, for example, in such an example, the second digital advertisement 406 can be, at least in part, promoting a product of the second vendor that is different than the product of the first vendor that may be promoted in the first digital advertisement 404. Thus, in this situation, as seen in FIG. 6, by selecting the second digital advertisement 406 vendor parameters associated with the second vendor can be triggered such that a second digital circular 400" will be generated in which the item card 410*b* associated with the second vendor is at a location that is before, or above, other item cards 410*a*, 410*c* that are not associated with products of the second vendor.

Additionally, in the example provided in FIG. 6, compared to the first digital circular 400' in which the in the item card 410*a* associated with the first vendor is at the first, or top location, in the rearranged second digital circular 400", the item card 410*a* associated with the first vendor has been moved to the middle position between the second and third item cards 410*b*, 410*c*. The actual position at which item cards 410*a-c* that, for a particular digital circular 400', 400", are for vendors (also generally referred to as "other vendors") that are not the vendor of the associated digital advertisement 404, 406 can be based on a variety of criteria. For example, according to certain embodiments, the location of the item cards 410*a-c* associated with such other vendors in the digital circular 400', 400" can be based on maintaining a predetermined order. For example, in this example, the order may be predetermined in a sequential numeric, alphabetic, or alphanumeric order, among others order or classifications, such as the item cards are sequentially labeled, identified, and/or numbered. In such an arrangement, if an item card 410*a-c* for the vendor of the associated digital advertisement 404, 406 is to be moved out of that order so as to be the first, or top item card 410*a-c* shown in the digital circular 400', 400", the remaining item cards 410*a-c* may otherwise remain in the sequential order. Additionally, or alternatively, the positioning of the item cards 410*a-c* for the other vendors can be based on size constraints, as well as the particular size of the item card 410*a-c*, as further discussed below with respect to FIGS. 7A and 7B.

Thus, according to certain embodiments, the dynamic retail media network system 200 can be configured to generate a digital circular 400', 400" of the retailer that includes the item cards 410*a-c* created based on the vendor parameters associated with the vendor of the selected digital advertisement that displays the selected item card 410*a-c* based on the display request of the vendor of the selected digital advertisement 404, 406. Further, as seen in the examples shown in FIGS. 5 and 6, the selected item card 410*a*, 410*b* is displayed based on the display request of the vendor of the selected digital advertisement 404, 406, as compared to the item cards 410*b*, 410*c* not associated with the vendor of the selected digital advertisement 404, 406.

The dynamic retail media network system 200 can also, according to certain embodiments, be configured to instruct the communications device 116*a*, 116*b* to dynamically display each item card 410*a-c* in an item card position and item card size to prioritize the display of the selected item card 410*a*, 410*b* in the digital circular 400', 400" based on the vendor parameters. Thus, each item card 410*a-c* can be dynamically formatted to be displayed after the selected item card 410*a*, 410*b* is dynamically formatted to be displayed based on the vendor parameters. According, the dynamic retail media network system 200 can be configured to display the selected item card 410*a*, 410*b* based on the display request of the vendor of the selected digital advertisement 404, 406, as compared to item cards 410*b*, 410*c* not associated with the vendor of the selected digital advertisement 404, 406.

With respect to the sizes of the item cards 410*a-c*, the in addition to being configured to dynamically select position or arranged item cards 410*a-c* in the digital circulars 400', 400", the dynamic retail media network system 200 and/or DDACS 50 can also be adapted to dynamically resize item cards 410*a-c* for the digital circulars 400', 400" based, at least in part, on the associated digital circular 400', 400" that is to be displayed in connection with the selection of an associated digital advertisement 404, 406, as previously discussed.

Figure 7B:
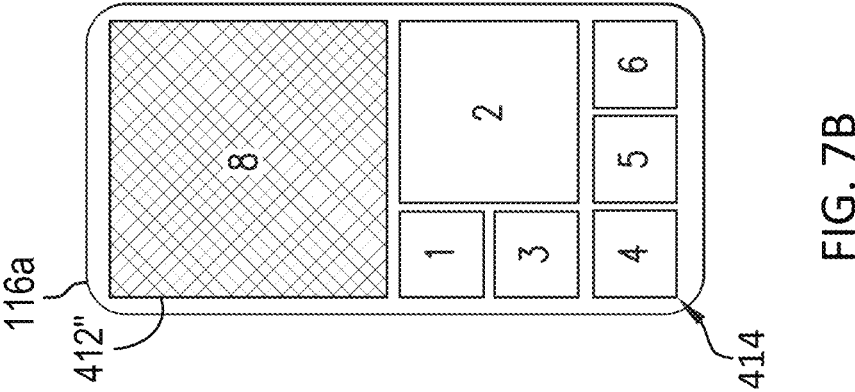
FIGS. 7A and 7B illustrate exemplary first and second digital circulars, respectively, having item cards arranged and sized among card partitions or cells of a digital circular grid in accordance with associated first and second vendor parameters.
Figure 7A:
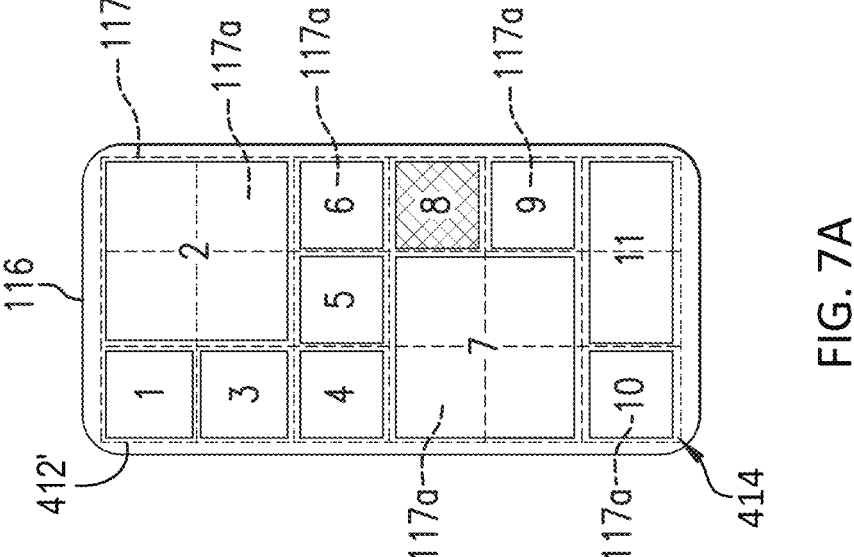

For example, FIGS. 7A and 7B depict a generic representation of digital circulars 412', 412" being shown on a display 414 of an exemplary dynamic retail media network communications device 116. The illustrated digital circulars 412', 412" are arranged in a form of a digital circular grid 117 comprising a plurality of item content cells or partitions 117*a*. For at least purposes of illustration, the digital circular grid 117 shown in FIG. 7A is sized to provide a 6 row by three column grid, with each individual item content cell or partition 117*a* occupying one row in one column of the grid 117. Thus, in the exemplary digital circular 412' shown in FIG. 7A Item Cards 1, 3-6 and 8-10 each have occupy a single item content cell or partition 117*a*, and thus have an item card size of 1×1. Further, Item Cards 2 and 7 occupy four item content cells or partitions 117*a* that are positioned in two adjacent rows and two columns so as to have an item card size of 4×4. Referencing FIG. 7A, if the digital advertisement 404 selected by the user 52 corresponds to an advertisement of a product of the first vendor, the dynamic retail media network system 200 can be configured to move the associated Item Card 2 for the first vendor to a top, or upper portion of the first digital circular 412', which can also be referred to as a primary position in the first digital circular 412'. In this example, as Item Card 2 has a 4×4 size, such positioning of the associated Item Card 2 at the primary position, as well as the 4×4 size of the Item Card 2, can result in the dynamic retail media network system 200 arranging, including, sizing, the other Item Cards 1-6 so as to accommodate the size and placement of the Item Card 2 for the first vendor.

Similarly, FIG. 7B illustrates a second digital circular 412″ that can provide the same general information as the first digital circular 412′ shown in FIG. 7A, but in which the Item Cards 1-11 have been rearranged and/or resized so that the Item Card 8 of a second vendor is instead at a primary position in the second digital circular 412″. Thus, while FIG. 7A illustrates the digital circular 412′ arranged to place the Item Card 2 associated with the first vendor at the primary position, the digital circular 412″ shown in FIG. 7B is arranged to place the Item Card 8 associated with the second vendor at the primary position. Further, in the example shown in FIG. 7B, in addition to increasing the size of the Items Card 8 to have a 3×3 size, the order and positioning of the other Item Cards 1-6 has been changed. More specifically, moving the Item Card 8 associated with the second vendor to the primary position has resulted in Item Cards 1-6 being moved downwardly to other, or secondary, positions. Further, the relatively larger size of Item Card 2 has resulted in the DDACS 50 and/or the other disclosed systems (e.g., the dynamic retail media network system 200) positioning at least Item Cards 1-6 in a manner that accommodates such differences in sizes while minimizing unoccupied space, and, moreover, to occupy each partition or cell 117*a*. Further, in this example, rearrangement of the item cards has also resulted in Item Cards 7 and 9-11 being moved downwardly so as to not currently be visible, and moreover, requiring the user to manipulate the display to see lower portions of the second digital circular 412″ to see those other Item Cards 7, 9-11 at such secondary positions.

The DDACS 50 and the digital retail media network system 200 can, in some embodiments, be configured to dynamically position and/or size a group of related items cards such that the group of related item cards is prioritized over the other unrelated items cards when displayed. For example, as discussed herein, a vendor may provide multiple related products under the same brand name. In such cases, the DDACS 50 and the digital retail media network system 200 may be configured to keep the individual item cards of the related products together (e.g., as a "brand block") when positioning and sizing the item cards to be included in a digital circular. In other examples, the DDACS 50 and the digital retail media network system 200 may be configured to group related item cards together, even in cases where the products or content associated with those item cards are not provided by the same vendor. For example, the DDACS 50 and the digital retail media network system 200 may be configured to group a first item card associated with a beverage product provided by a first vendor with a second item card associated with a snack product provided by a second vendor. In yet another example, the DDACS 50 and/or the digital retail media network system 200 may be configured to group together a first item card associated with strawberries provided by a first vendor, a second item card associated with a shortcake product provided by a second vendor, a third item card associated with a whipped cream product provided by a third vendor, and a fourth item card associated with a recipe for strawberry shortcake. In some embodiments, one or more of the identifiers discussed herein (e.g., Product ID, Card ID, Vendor ID, Brand ID, etc.) can be utilized by the DDACS 50 and/or the digital retail media network system 200 to facilitate grouping of related item cards.

The DDACS 50 and/or the digital retail media network system 200 can also, in some embodiments, dynamically position and/or size a group of related items cards based on digital circular arrangement data (e.g., one or more identifiers or a string of characters) combined with or included within the promotional URL 42 or the base URL 40. For example, promotional URL 42 or the base URL 40 may include the Product ID of particular product and, in response to a user 52 attempting to access the digital circular referenced by the promotional URL 42, the DDACS 50 and/or the digital retail media network system 200 can determine, based at least in part on the Product ID, that the particular product is related to other products and that the group of related products should be positioned together within the digital circular. As discussed herein, DDACS 50 and/or the digital retail media network system 200 can link or otherwise associate together identifiers corresponding to related products, vendors, retailers, item cards, etc. It should be appreciated that such linking of identifiers advantageously groups different content items together.

Figure 8B:
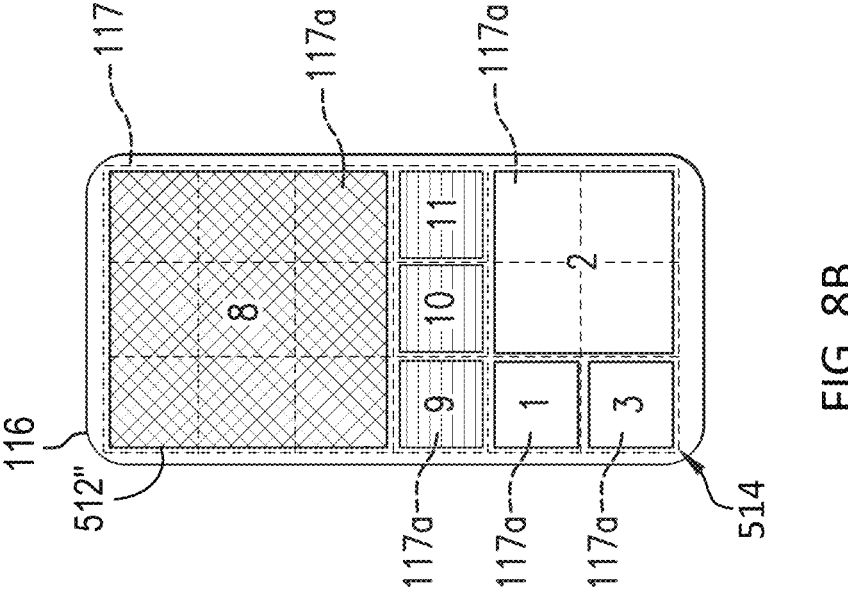
FIGS. 8A and 8B illustrate an exemplary representation of a group of related item cards displayed in a first digital circular that are dynamically rearranged and resized for display in a second digital circular based on formatting data encoded in a uniform resource identifier.
Figure 8A:
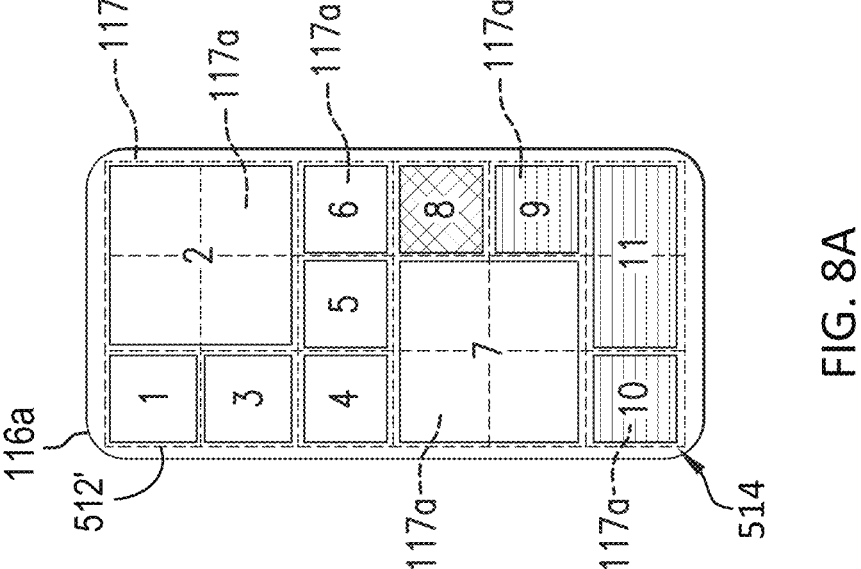

FIGS. 8A and 8B depict generic representations of digital circulars 512′, 512″ being shown on a display 514 of an exemplary dynamic retail media network communications device 116. The illustrated digital circulars 512′, 512″ are arranged in a form of a digital circular grid 117 comprising a plurality of item content cells or partitions 117*a*. Referencing both FIGS. 8A and 8B, Item Cards 8-11 are illustratively shown with hatching and/or lining to indicate that each of those item cards correspond to products or content that are related and therefore form a group. It should be appreciated that, in operation, the digital circulars generated by the DDACS 50 and/or the digital retail media network system 200 may or may not include a visual indication (e.g., hatching, lining, highlighting, etc.) that item cards are related or grouped together.

For at least purposes of illustration, the digital circular grid 117 shown in FIG. 8A is sized to provide a six row by three column grid, with each individual item content cell or partition 117*a* occupying one row in one column of the grid 117. Thus, in the exemplary digital circular 512′ shown in FIG. 8A, Item Cards 1, 3-6 and 8-10 each have occupy a single item content cell or partition 117*a*, and thus have an item card size of 1×1. Further, Item Cards 2 and 7 each occupy four item content cells or partitions 117*a* that are positioned in two adjacent rows and two columns so as to have an item card size of 4×4. Item Card 11 occupies two item content cells or partitions 117*a* that are positioned in one row and two adjacent columns so as to have an item card size of 1×2.

Referencing the exemplary digital circular 512″ shown in FIG. 8B, the digital circular grid 117 shown in that figure is also sized to provide a six row by three column grid, with each individual item content cell or partition 117*a* occupying one row in one column of the grid 117. Thus, in the exemplary digital circular 512″ shown in FIG. 8B, Item Cards 1, 3, and 9-11 each occupy a single item content cell or partition 117*a*, and thus have an item card size of 1×1. Further, Item Card 8 occupies six content cells or partitions 117*a*, and thus has an item card size of 3×3. Item card 2 occupies four item content cells or partitions 117*a* that are positioned in two adjacent rows and two columns so as to have an item card size of 4×4.

In embodiments in which a group of related items cards of a digital circular is dynamically positioned or sized based on the promotional URL 42 or the base URL 40, the DDACS 50 and/or the digital retail media network system 200 may be configured to determine and insert the digital circular arrangement data (e.g., one or more identifiers or a string of characters) into the promotional URL 42 or the base URL 40 based on, or otherwise as function of, a user selection of an item card displayed in a first digital circular. For example, as illustratively shown in FIG. 8A, a user may select Item Card 8 being displayed in a first digital circular 512'. As illustratively shown in FIG. 8A by way of hatching and lining, Item Card 8 (or the product or content associated therewith) is related to Item Cards 9-11 (or the products or content associated therewith). Therefore, in some embodiments, the DDACS 50 and/or the digital retail media network system 200 may determine to incorporate the Product ID associated with the particular product corresponding to Item Card 8 into the promotional URL 42 or the base URL 40. Alternatively, as discussed herein, the DDACS 50 and/or the digital retail media network system 200 may instead determine to incorporate the Card ID associated with Item Card 8 or any other suitable identifier into the promotional URL 42 or the base URL 40.

Continuing with the previous example and referring now to FIG. 8B, the DDACS 50 and/or the digital retail media network system 200 may use the promotional URL 42 or the base URL 40 containing the Product ID associated with the particular product corresponding to Item Card 8 (or other suitable identifier) to generate a second digital circular 512" that includes Item Card 8 and related Item Cards 9-11 grouped together with each related item card being positioned and/or sized in more prominent positions or sizes than the other unrelated item cards (e.g., Item Cards 1-7). As illustratively shown in FIG. 8B, Item Cards 4-7 are no longer visible in the main view and thus a user 52 would be required to scroll down to see those item cards.

Again, referencing FIGS. 5 and 6, according to certain embodiments, the dynamic retail media network system 200 is also configured to instruct the communications device display 414 to dynamically adjust the display 414 to display updates to the digital circular grid 117 that displays each item card 410a-c based on updates to a rearrangement of each item card 410a-c due to a change in selection of the digital advertisement received from the end user 52. According to certain embodiments, such instructions can result in a spatial position of each item card 410a-c, as displayed in a digital circular 400', 400" being dynamically adjusted as a plurality of vendor parameters associated with the change in selection of the digital advertisement are updated, thereby triggering the rearrangement of each item card 410a-c. Thus, for example, different vendors parameters associated with different vendors can trigger different arrangements of the item cards 410a-c for the associated digital circulars, as illustrated, for example, by the first and second digital circulars 400', 400" shown in FIG. 6.

According to certain embodiments, the dynamic retail media network system 200 is configured to receive from the end user 52 a first selection, such as, for example, via the communication device 116a, of a first digital advertisement 404 associated with a first vendor that is displayed on the digital media platform associated with the retailer, with a second digital advertisement 406 associated with a second vendor also displayed on the digital media platform associated with the retailer. The dynamic retail media network system 200 can also be configured to trigger the first set of vendor parameters associated with the first vendor of the selected first digital advertisement 404 to determine the position of a first item card 410a associated with the selected first digital advertisement 404 of the first vendor to be displayed in the first digital circular 400' associated with the retailer based on the first set of vendor parameters associated with the first vendor. As previously discussed, the first set of vendor parameters can be associated with the first vendor of the selected first digital advertisement 404. Additionally, the first set of vendor parameters can be indicative of a presentation of the first item card 410a as displayed in the digital circular 400' of the retailer based on a first vendor priority of the first vendor to display the first item card 410a as compared to a display of at least a second item card 410b, which could also, in some examples, be or include the third item card 410c, among others, not included in the selected first digital advertisement 404.

The dynamic retail media network system 200 can also be configured to generate a first digital circular 400' of the retailer that includes the first item card 410a positioned at a location within the first digital circular 400' that is, at least in part, based on the first vendor parameters associated with the first vendor of the selected first digital advertisement 404. Moreover, the dynamic retail media network system 200 can be configured to generate such a first digital circular 400' with an arrangement that displays the first item card 410a based on a display request of the first vendor of the selected digital advertisement 404. Further, the dynamic retail media network system 200 can generate the first digital circular 400' such that the first digital circular 400' includes at least the second item card 410b, which could also, in some examples, be or include the third item card 410c, among others, positioned in a secondary position as compared to the first item card 410a. According to certain embodiments, the secondary position of the second item card 410b can be determined to be at a location or position after, such as, for example, beneath, the position of the first item card 410a based on the first vendor parameters.

As seen in at least FIG. 5, according to certain embodiments, the dynamic retail media network system 200 can also be configured to instruct the communications device 116a to dynamically display the first item card 410a in a first item card position and a first item card size to prioritize the display of the first item card 410a as compared to at least the second item card 410b, that is/are displayed in the secondary item card position. For example, as seen in FIG. 5, with respect to the first digital circular 400', the first item card 410a, which can be associated with the first vendor, is at a top position. Additionally, or alternatively, similar to the discussion above with respect to FIG. 7B and the 3×3 size of the item card 8, the vendor parameters can also relate to the first item card 410a being sized in a manner that can prioritize the display of the first item card 410a. In such an example, the second item card 410b, which could also, in some examples, be or include the third item card 410c, among others, can have a secondary item card size that is secondary to, or less prominent, than the first item card position and the first item card size of the first item card 410a. Again, such less prominence of the secondary item card(s) 410b can, for example, relate to one or more of a position and size of the item card(s) 410b within the first digital circular 400'.

Additionally, or alternatively, the dynamic retail media network system 200 can also be configured to receive from the end user 52 a second selection of a second digital advertisement 406 associated with the second vendor that is displayed on the digital media platform associated with the retailer, with the first digital advertisement associated with the first vendor displayed on the digital media platform also be associated with the retailer. According to such an embodiment, such a second selection can trigger a second set of vendor parameters associated with the second vendor of the selected digital advertisement 406. As demonstrated by at least FIG. 6, such vendor parameters associated with the second vendor can be utilized to determine the position of the second item card 410*b* associated with the selected second digital advertisement 406 of the second vendor to be displayed in the digital circular associated with the second set of vendor parameters associated with the second vendor, which, in this example, can be referred to as the second digital circular 400". Further, the second set of vendor parameters associated with the second vendor of the selected second digital advertisement 406 can be indicative of a presentation of the second item card 410*b* as displayed in the second digital circular 400" of the retailer based on a second vendor priority of the second vendor to display the second item card 410, particularly as compared to the display of at least the first item card 410 included in the first digital advertisement 404.

The dynamic retail media network system 200 can also be configured to rearrange the positioning of the second item card 410*b* and at least the first item card 410*a* based on the second vendor parameters associated with the second vendor of the selected second digital advertisement 406. Such rearrangement can, for example, be based on the display request of the second vendor of the second selected digital advertisement 406, and can include the first item card 410*a* being positioned in the secondary position as compared to the second item card 410*b*. Additionally, as shown in at least FIG. 6, according to certain embodiments, the second item card 410*b* can replace the position of the first item card 410*a* such that the first item card 410*a* is moved to a secondary position. Again, in the embodiment shown in FIG. 6, such a secondary position can correspond, for example, to a location that is not a primary position in the digital circular, which, in this example, is the second digital circular 400".

The dynamic retail media network system 200 can further be configured instruct the communications device 116*b* to dynamically display the second item card 410*a* in either, or both, the first item card position and with the first item card size so as to prioritize the display of the second item card 410*b* as compared to the first item card 410*a*. For example, as shown by a comparison of the first and second digital circulars 400', 400" shown in FIG. 6, rather than having the first item card 410*a* of the first vendor be at the top position, as shown in the first digital circular 400', the dynamic retail media network system 200 can further be configured to rearranged the first digital circular so as that a second digital circular 400" is displayed at which the second item card 410*b* of the second vendor is instead displayed at the top, or upmost position. Additionally, again referencing item card 8 in FIGS. 7A and 7B, such instructions can also involve resizing the prioritized item card 410*b*. For example, in the example shown in FIGS. 7A and 7B, the dynamic retail media network system 200 can instruct the communications device to change not only the location of item card 8, but also change item card 410 from having a 1×1 size (FIG. 7A) to having a larger 3×3 size (FIG. 7B).

According to certain embodiments, the dynamic retail media network system 200 can be further configured to monitor each end user 52 from a plurality of end users 52 that selects the first digital advertisement 404 associated with the first vendor that is displayed on digital media platform associated with the retailer via a corresponding communications device 116*a* of each end user 52. The dynamic retail media network system 200 can also be configured to track each end user 52 as each end user 52 navigates the digital circular 400' of the retailer to determine whether each end user 52 selects the first item card positioned in the digital circular 400' based on the first vendor position provided by the first set of vendor parameters. Additionally, the dynamic retail media network system 200 can determine each end user 52 that purchases a first product as advertised in the first digital advertisement 404 and displayed in the first item card 410*a* of the first digital circular 400' based on selecting the first digital advertisement 404 advertising the first product and selecting the first item card 410*a* of the first digital circular 400' displaying the first product. The dynamic retail media network system 200 can further be configured to provide to the first vendor a quantity of end users 52 that purchases the first product as advertised in the first digital advertisement 404 and that is displayed in the first item card 410*a* of the digital circular 400' based on selecting the first digital advertisement 404 advertising the first product and selecting the first item card 410*a* of the digital circular displaying the first product.

The dynamic retail media network system 200 can also be configured to monitor each end user 52 from the plurality of end users 52 that selects the first digital advertisement 404 associated with the first vendor that is displayed on the digital media platform associated with the retailer via the corresponding communications device of each end user 52. Additionally, the system 200 can be configured to track each end user 52 that navigates the first digital circular 400' of the retailer. According to certain embodiments, such tracking can correspond to determining whether each end user 52 selects the second item card 410*b* positioned in the secondary position of the first digital circular 400', as compared to the first item card 410*a* that is otherwise positioned in the first digital circular 400' based on the first vendor portion provided by the first set of vendor parameters.

Additionally, or alternatively, the dynamic retail media network system 200 can be configured to determine each end user 52 that purchases a second product as advertised as displayed in the second item card 410*b* in the secondary position of the first digital circular 400' based on selecting the first digital advertisement 404 advertising the first product and selecting the second item card 410*b* of the first digital circular 400' displaying the second item card 410*b* in the secondary position. The system 200 can also be configured to provide to the second vendor a quantity of end users 52 that purchase the second product, as displayed in the second item card 410*b* in the secondary position of the first digital circular 400' based on selecting the first digital advertisement 404 advertising the first product and selecting the second item card 410*b* of the digital circular displayed in the secondary position, as compared to the first product.

The dynamic retail media network system 200 can further be configured to generate the digital circular of the retailer that includes an item card position and an item card size associated with each item card partition 117*a* that each item card 410*a-c* is to be displayed based on the vendor parameters associated with the vendor of the selected digital advertisement 404, 406. The selected item card 410*a-c* can correspond to the selected digital advertisement 404, 406 that is displayed in the item card position and the item card size that corresponds with the display request of the vendor of the selected digital advertisement 404, 406, as at least compared to the item cards 410*a-c* not associated with the vendor of the selected digital advertisement 404, 406.

Further, the dynamic retail media network system 200 can be configured to instruct the communications device 116*a*, 116*b* to dynamically display each item card 410*a-c* in an item card position and an item card size associated with each item card partition 117*a* to prioritize the display of the selected item card 410*a-c* in the digital circular 400', 400" of the retailer based on the vendor parameters. The selected item card 410a-c can be dynamically formatted with item card content to dynamically display the selected item card 410a-c with the item card content as spatially positioned in a digital circular grid 117 to prioritize the display of the item card content of the selected item card 410a-c based on the vendor parameters.

The dynamic retail media network system 200 can also be configured to dynamically receive updates to the digital circular 400', 400" as each item card 410a-c included in the digital circular 400', 400" is/are updated based on the corresponding vendor parameters associated with each corresponding selected digital advertisement 404, 406 in real-time. Moreover, each item card 410a-c can change as the corresponding vendor parameters associated with each corresponding selected digital advertisement 404, 406 changes. Thus, for example, according to certain embodiments, the retailer or vendor can access the DDACS 50, such as, for example, the backend 70, including the client portal 128, to update vendor parameter, information or details regarding the advertisement or a change in advertisement, and/or with respect to the product(s) that may, or may not, be part of the updated advertisement or promotion, among other changes. The DDACS 50 can be adapted to update the associated item card 410a-c, including with respect to the placement and/or size of the item card 410a-c, and/or with respect to the content item that is to correspond to the item card 410a-c. The dynamic retail media network 200 can also dynamically instruct the communications device 116a, 116b to display each updated item card 410a-c included in the digital circular 400', 400" in real-time as the corresponding vendor parameters associated with each corresponding selected digital advertisement change in real-time.

According to certain embodiments, the dynamic retail media network system 200 can also be configured to dynamically receive updates to the digital circular as a size associated with each item card 410a-c in the digital circular 400', 400" is adjusted based on the corresponding updated to vendor parameters associated with each corresponding selected digital advertisement 404, 406. According to certain embodiments, such updates to the vendor parameters can be in real-time, as previously discussed. Further, with each selected digital advertisement change, such updates in vendor parameter can trigger a change by the dynamic retail media network system 200 in the size associated with each item card 410a-c, including the size in terms of the number of partitions 117a occupied by the associated item card(s) 410a-c. The system 200 can also be adapted to dynamically instruct the communications device 116a, 116b to display each updated size of each updated item card 410a-c included in the digital circular 400', 400" in real-time as the corresponding vendor parameters associated with each selected digital advertisement 404, 406 are updated in real-time, which can thereby trigger a change in size associated with each item card 410a-c.

Again referencing FIG. 5, according to certain embodiments, the DDACS 50 and/or the retail media network system 200 can monitor those individuals who clicked on the first digital advertisement 404 associated with at least the first vendor. Additionally, or alternatively, the DDACS 50 and/or the retail media network system 200 can monitor those users who subsequently viewed the item content of the product associated with that vendor and a corresponding item card 410a that was positioned at a primary position in the first digital circular 400'. Further, instances in which the users 52 who viewed the content item associated with the item card 410a for the first vendor that was positioned at the primary position in the first digital circular 400' subsequently visited the associated retailer, and moreover, the corresponding store 416 of the retailer can also be monitored. For example, instances in which such users 52 subsequently visited a physical store 416 of the retailer can be tracked via, for example, the visitation reporting system 82 of the DDACS 50. For instance, information obtained via geo-tracking can be used to determine when the communications device 116a of such users 52 visited the store 416 of the retailer, which may, for example, be a brick and motor store or sales/distribution location. However, a variety of other types of information or data regarding the movement, location, and/or purchases of the users 52, among other information, can be used to track the subsequent visits of such users 52 to the store 416 of the retailer. In certain embodiments, such store visits by users 42 who had previously viewed the content item of the first vendor in the first digital circular 400' can provide an indication of a direct return to the first vendor on the expenditure paid for the placement of the item content of that vendor in the first digital circular. Additionally, or alternatively, such user 52 information can provide an indication of the direct return to the first vendor associated with paying for primary positioning of the item card 410a associated with that first vendor in the first digital circular 400'.

Continuing with the foregoing example, in certain instances the item card 410a of the first vendor may, instead of being at a primary position, be at a secondary position. For example, as previously discussed with respect to at least FIG. 6, in certain instances in which a digital advertisement, such as for example, the illustrated second digital advertisement 406 is associated with a vendor other than the first vendor. In such an example, as demonstrated by the second digital circular 400", the item card 410b for that other vendor can be in the primary position, while the item card 410a of the first vendor is in a secondary position. While FIG. 6 illustrates first and second digital advertisements 404, 406 and corresponding digital circulars 400', 400", in practice a plurality of digital advertisements can be simultaneously occurring that involve vendors other than, or in addition to, the above-referenced first and second vendors.

In such situations, the dynamic retail media network system 200 can generate a plurality of digital circulars, with each digital circular being arranged such that item cards associated those vendors other than at least the first vendor receive the primary position and/or an associated larger size. Thus, in such situations, those other digital circulars can be arranged such that the item card 410a of the first vendor receives a secondary position and/or a smaller size. Accordingly, users 52 viewing those other digital circulars may be connected to, or otherwise receive, those other digital circulars in manners that may be unrelated to the first vendor and/or product(s) of the first vendor. Accordingly, when the users 52 that viewed those other digital circulars subsequently visit the associated store 416 of the retailer, those visits may be driven by those other digital advertisements and/or other digital circulars, and the associated products of the other vendors. In such situations, the first vendor may not be receiving a direct return from expenditures by the first vendor for the first digital advertisement 404 and the associated positioning in the first digital circular 400', as discussed above. However, by being included in those other digital circulars in which the products of other vendors are at primary positions, and/or being available at the same store 416 as the products of those other vendors, the first vendor may receive an indirect return from store visits by those users 52 that may be driven by the products of other vendors. Additionally, such indirect return can be compounded based on the number of digital advertisements associated with other vendors, and associated number of digital circular arrangements in which those other vendors are receiving the primary positioning. Thus, such indirect return to the first vendor based on the users 52 who viewed the digital advertisements associated with other vendors, and/or those other digital circulars and corresponding arrangements, can also be tracked. Such tracking can be similar to the tracking discussed above with respect to determining a direct return. For example, according to certain embodiments, such tracking can be performed by, or via use of, the visitation reporting system 82 of the DDACS 50, among other manners of tracking. Moreover, according to certain embodiments, the direct return received for each of the other vendors can be tracked in a manner similar to that discussed for tracking the direct return for the first vendor, and collectively used to determine an associated compound return for the first vendor.

Figure 9:
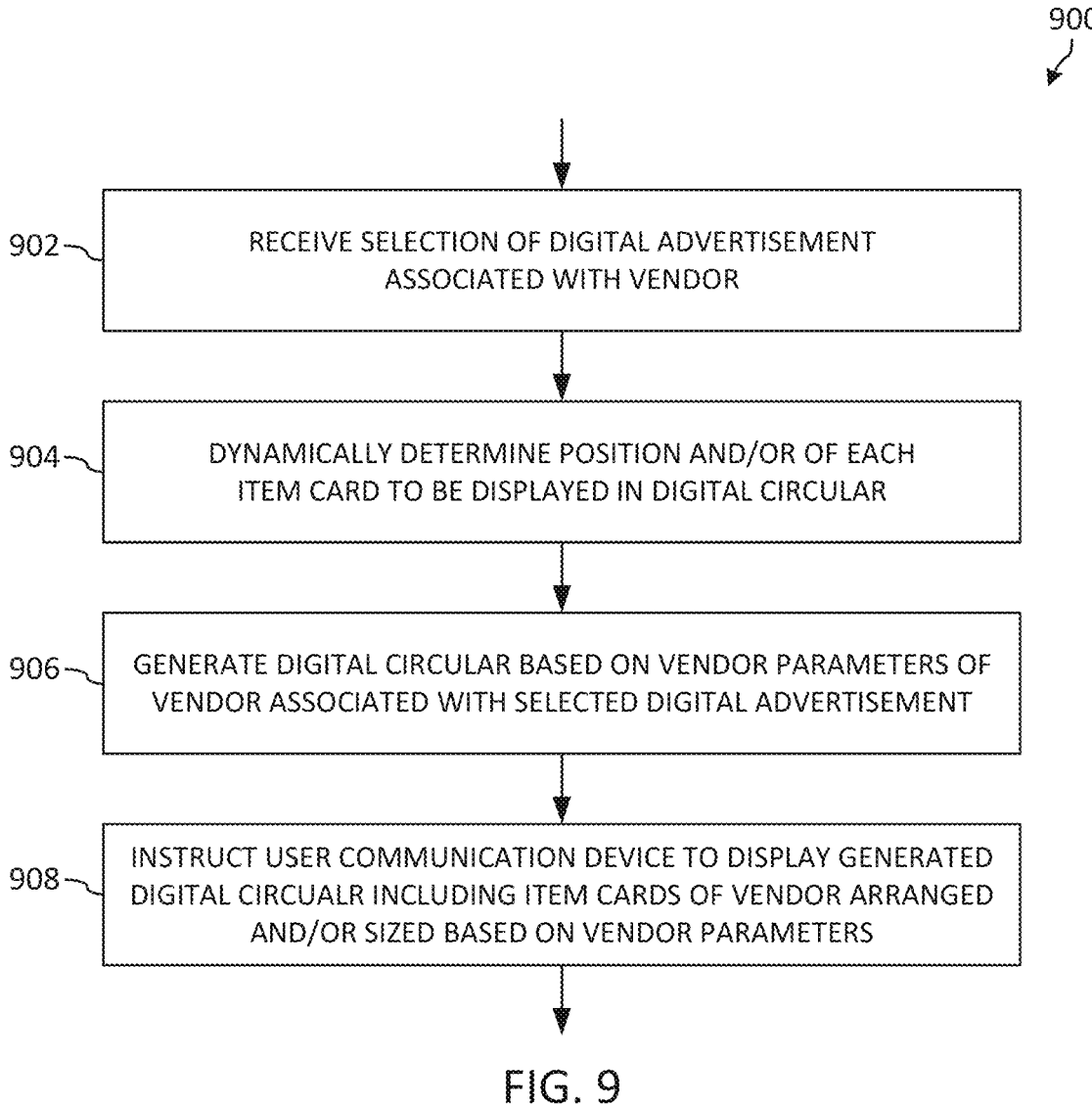
FIG. 9 is a simplified flow diagram of at least one embodiment of a method of dynamically generating a digital circular including a plurality of digital circular content items based on vendor parameters.

Referring now to FIG. 9, in use, the dynamic retail media network system 200 and/or the DDACS 50 may execute a method 900 for dynamically generating a digital circular including a plurality of digital circular content items based on one or more vendor parameters. It should be appreciated that the particular blocks of the method 900 are illustrated by way of example, and such blocks may be combined or divided, added or removed, and/or reordered in whole or in part depending on the particular embodiment, unless stated to the contrary. It should further be appreciated that the blocks of the method 900 are configured to provide any or all the functionality described above in connection with the dynamic retail media network system 200 and/or the DDACS 50 and are not limited to the specific functionality described below in connection with the method 900.

The illustrative method 900 begins with block 902 in which the dynamic retail media network system 200 and/or the DDACS 50 receives a selection of a digital advertisement associated with a vendor. The digital advertisement can correspond to a product or service of the vendor, or a group of products or services of the vendor. The selection can be made by a user 52 via a dynamic retail media network communication device 116 or other computing device (e.g., computer, smartphone, portable device, smart display, etc.).

In block 904, the dynamic retail media network system 200 and/or the DDACS 50 dynamically determines a position and/or size of each item card of a plurality of item cards to be displayed in the digital circular. In some embodiments, the dynamic retail media network system 200 and/or the DDACS 50 determines the position of each item card to be displayed in the digital circular based on, or otherwise as a function of, one or more vendor parameters associated with the vendor of the selected digital advertisement. Additionally, in some embodiments, the one or more vendor parameters associated with the vendor are indicative of the manner in which each item card is to be displayed in the digital circular of a retailer. For example, the vendor parameters may be indicative of a priority in which item cards associated with the vendor associated with the selected advertisement should be displayed in the digital circular compared to item cards associated with other vendors.

In block 906, the dynamic retail media network system 200 and/or the DDACS 50 generates the digital circular based on, or otherwise as a function of, the vendor parameters of the vendor associated with the selected digital advertisement. For example, the dynamic retail media network system 200 and/or the DDACS 50 may generate the digital circular based on the vendor priority of the vendor associated with the selected advertisement. In such example, item cards associated with the vendor may be displayed more (or less) prominently in the digital circular compared to item cards associated with other vendors based on the vendor priority. In some embodiments, the dynamic retail media network system 200 and/or the DDACS 50 dynamically positions or resizes item cards associated with the vendor to more prominently display those cards in the digital circular compared to the item cards of other vendors.

In block 908, the dynamic retail media network system 200 and/or the DDACS 50 instructs the dynamic retail media network communication device 116 or other computing device (e.g., computer, smartphone, portable device, smart display, etc.) of the user 52 to display the generated digital circular including the item cards of the vendor associated the selected advertisement and the item cards of other vendors. In some embodiments, the dynamic retail media network communication device 116 or other computing device of the user 52 is configured to display the generated digital circular including the item cards as arranged and/or sized based on the vendor priority (or other vendor parameters).

Although blocks 902-908 are described in a relatively serial manner, it should be appreciated that various blocks of the method 900 may be performed in parallel in some embodiments.

Figure 10:
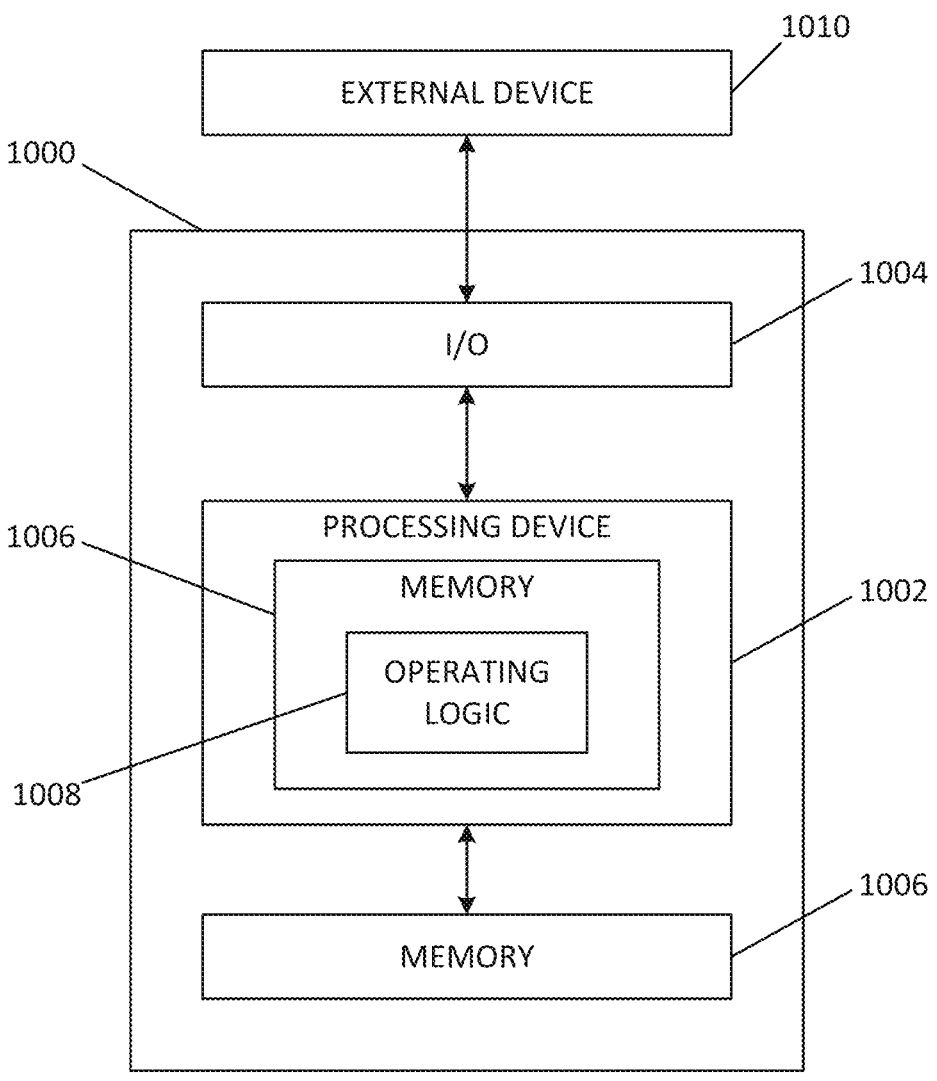
FIG. 10 is a simplified block diagram of at least one embodiment of a computing device.

Referring now to FIG. 10, a simplified block diagram of at least one embodiment of a computing device 1000 is shown. The illustrative computing device 1000 depicts at least one embodiment of each of the computing devices, systems, servicers, controllers, switches, gateways, engines, modules, and/or computing components described herein (e.g., which collectively may be referred to interchangeably as computing devices, servers, or modules for brevity of the description). For example, the various computing devices may be a process or thread running on one or more processors of one or more computing devices 1000, which may be executing computer program instructions and interacting with other system modules in order to perform the various functionalities described herein. Unless otherwise specifically limited, the functionality described in relation to a plurality of computing devices may be integrated into a single computing device, or the various functionalities described in relation to a single computing device may be distributed across several computing devices. Further, in relation to the computing systems described herein, the various servers and computer devices thereof may be located on local computing devices 1000 (e.g., on-site at the same physical location as the agents of the contact center), remote computing devices 1000 (e.g., off-site or in a cloud-based or cloud computing environment, for example, in a remote data center connected via a network), or some combination thereof. In some embodiments, functionality provided by servers located on computing devices off-site may be accessed and provided over a virtual private network (VPN), as if such servers were on-site, or the functionality may be provided using a software as a service (SaaS) accessed over the Internet using various protocols, such as by exchanging data via extensible markup language (XML), JSON, and/or the functionality may be otherwise accessed/leveraged.

In some embodiments, the computing device 1000 may be embodied as a server, desktop computer, laptop computer, tablet computer, notebook, netbook, Ultrabook™, cellular phone, mobile computing device, smartphone, wearable computing device, personal digital assistant, Internet of Things (IoT) device, processing system, wireless access point, router, gateway, and/or any other computing, processing, and/or communication device capable of performing the functions described herein.

The computing device 1000 includes a processing device 1002 that executes algorithms and/or processes data in accordance with operating logic 1008, an input/output device 1004 that enables communication between the computing device 1000 and one or more external devices 1010, and memory 1006 which stores, for example, data received from the external device 1010 via the input/output device 1004.

The input/output device 1004 allows the computing device 1000 to communicate with the external device 1010. For example, the input/output device 1004 may include a transceiver, a network adapter, a network card, an interface, one or more communication ports (e.g., a USB port, serial port, parallel port, an analog port, a digital port, VGA, DVI, HDMI, FireWire, network port, or any other type of communication port or interface), and/or other communication circuitry. Communication circuitry of the computing device 1000 may be configured to use any one or more communication technologies (e.g., wireless or wired communications) and associated protocols (e.g., Ethernet, Bluetooth®, Wi-Fi®, WiMAX, etc.) to effect such communication depending on the particular computing device 1000. The input/output device 1004 may include hardware, software, and/or firmware suitable for performing the techniques described herein.

The external device 1010 may be any type of device that allows data to be inputted or outputted from the computing device 1000. For example, in various embodiments, the external device 1010 may be embodied as one or more of the devices/systems described herein, and/or a portion thereof. Further, in some embodiments, the external device 1010 may be embodied as another computing device, switch, diagnostic tool, controller, printer, display, alarm, peripheral device (e.g., keyboard, mouse, touch screen display, etc.), and/or any other computing, processing, and/or communication device capable of performing the functions described herein. Furthermore, in some embodiments, it should be appreciated that the external device 1010 may be integrated into the computing device 1000.

The processing device 1002 may be embodied as any type of processor(s) capable of performing the functions described herein. In particular, the processing device 1002 may be embodied as one or more single or multi-core processors, microcontrollers, or other processor or processing/controlling circuits. For example, in some embodiments, the processing device 1002 may include or be embodied as an arithmetic logic unit (ALU), central processing unit (CPU), digital signal processor (DSP), graphics processing unit (GPU), field-programmable gate array (FPGA), application-specific integrated circuit (ASIC), and/or another suitable processor(s). The processing device 1002 may be a programmable type, a dedicated hardwired state machine, or a combination thereof. Processing devices 1002 with multiple processing units may utilize distributed, pipelined, and/or parallel processing in various embodiments. Further, the processing device 1002 may be dedicated to performance of just the operations described herein, or may be utilized in one or more additional applications. In the illustrative embodiment, the processing device 1002 is programmable and executes algorithms and/or processes data in accordance with operating logic 1008 as defined by programming instructions (such as software or firmware) stored in memory 1006. Additionally or alternatively, the operating logic 1008 for processing device 1002 may be at least partially defined by hardwired logic or other hardware. Further, the processing device 1002 may include one or more components of any type suitable to process the signals received from input/output device 1004 or from other components or devices and to provide desired output signals. Such components may include digital circuitry, analog circuitry, or a combination thereof.

The memory 1006 may be of one or more types of non-transitory computer-readable media, such as a solid-state memory, electromagnetic memory, optical memory, or a combination thereof. Furthermore, the memory 1006 may be volatile and/or nonvolatile and, in some embodiments, some or all of the memory 1006 may be of a portable type, such as a disk, tape, memory stick, cartridge, and/or other suitable portable memory. In operation, the memory 1006 may store various data and software used during operation of the computing device 1000 such as operating systems, applications, programs, libraries, and drivers. It should be appreciated that the memory 1006 may store data that is manipulated by the operating logic 1008 of processing device 1002, such as, for example, data representative of signals received from and/or sent to the input/output device 1004 in addition to or in lieu of storing programming instructions defining operating logic 1008. As shown in FIG. 10, the memory 1006 may be included with the processing device 1002 and/or coupled to the processing device 1002 depending on the particular embodiment. For example, in some embodiments, the processing device 1002, the memory 1006, and/or other components of the computing device 1000 may form a portion of a system-on-a-chip (SoC) and be incorporated on a single integrated circuit chip.

In some embodiments, various components of the computing device 1000 (e.g., the processing device 1002 and the memory 1006) may be communicatively coupled via an input/output subsystem, which may be embodied as circuitry and/or components to facilitate input/output operations with the processing device 1002, the memory 1006, and other components of the computing device 1000. For example, the input/output subsystem may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations.

The computing device 1000 may include other or additional components, such as those commonly found in a typical computing device (e.g., various input/output devices and/or other components), in other embodiments. It should be further appreciated that one or more of the components of the computing device 1000 described herein may be distributed across multiple computing devices. In other words, the techniques described herein may be employed by a computing system that includes one or more computing devices. Additionally, although only a single processing device 1002, I/O device 1004, and memory 1006 are illustratively shown in FIG. 10, it should be appreciated that a particular computing device 1000 may include multiple processing devices 1002, I/O devices 1004, and/or memories 1006 in other embodiments. Further, in some embodiments, more than one external device 1010 may be in communication with the computing device 1000.

The computing device 1000 may be one of a plurality of devices connected by a network or connected to other systems/resources via a network. The network may be embodied as any one or more types of communication networks that are capable of facilitating communication between the various devices communicatively connected via the network. As such, the network may include one or more networks, routers, switches, access points, hubs, computers, client devices, endpoints, nodes, and/or other intervening network devices. For example, the network may be embodied as or otherwise include one or more cellular networks, telephone networks, local or wide area networks, publicly available global networks (e.g., the Internet), ad hoc networks, short-range communication links, or a combination thereof. In some embodiments, the network may include a circuit-switched voice or data network, a packet-switched voice or data network, and/or any other network able to carry voice and/or data. In particular, in some embodiments, the network may include Internet Protocol (IP)-based and/or asynchronous transfer mode (ATM)-based networks. In some embodiments, the network may handle voice traffic (e.g., via a Voice over IP (VOIP) network), web traffic, and/or other network traffic depending on the particular embodiment and/or devices of the system in communication with one another. In various embodiments, the network may include analog or digital wired and wireless networks (e.g., IEEE 802.11 networks, Public Switched Telephone Network (PSTN), Integrated Services Digital Network (ISDN), and Digital Subscriber Line (xDSL)), Third Generation (3G) mobile telecommunications networks, Fourth Generation (4G) mobile telecommunications networks, Fifth Generation (5G) mobile telecommunications networks, a wired Ethernet network, a private network (e.g., such as an intranet), radio, television, cable, satellite, and/or any other delivery or tunneling mechanism for carrying data, or any appropriate combination of such networks. It should be appreciated that the various devices/systems may communicate with one another via different networks depending on the source and/or destination devices/systems.

It should be appreciated that the computing device 1000 may communicate with other computing devices 1000 via any type of gateway or tunneling protocol such as secure socket layer or transport layer security. The network interface may include a built-in network adapter, such as a network interface card, suitable for interfacing the computing device to any type of network capable of performing the operations described herein. Further, the network environment may be a virtual network environment where the various network components are virtualized. For example, the various machines may be virtual machines implemented as a software-based computer running on a physical machine. The virtual machines may share the same operating system, or, in other embodiments, different operating system may be run on each virtual machine instance. For example, a "hypervisor" type of virtualizing is used where multiple virtual machines run on the same host physical machine, each acting as if it has its own dedicated box. Other types of virtualization may be employed in other embodiments, such as, for example, the network (e.g., via software defined networking) or functions (e.g., via network functions virtualization).

Accordingly, one or more of the computing devices 1000 described herein may be embodied as, or form a portion of, one or more cloud-based systems. In cloud-based embodiments, the cloud-based system may be embodied as a server-ambiguous computing solution, for example, that executes a plurality of instructions on-demand, contains logic to execute instructions only when prompted by a particular activity/trigger, and does not consume computing resources when not in use. That is, a system may be embodied as a virtual computing environment residing "on" a computing system (e.g., a distributed network of devices) in which various virtual functions (e.g., Lambda functions, AZURE functions, GOOGLE CLOUD functions, and/or other suitable virtual functions) may be executed corresponding with the functions of the system described herein. For example, when an event occurs (e.g., data is transferred to the system for handling), the virtual computing environment may be communicated with (e.g., via a request to an API of the virtual computing environment), whereby the API may route the request to the correct virtual function (e.g., a particular server-ambiguous computing resource) based on a set of rules. As such, when a request for the transmission of data is made by a user (e.g., via an appropriate user interface to the system), the appropriate virtual function(s) may be executed to perform the actions before eliminating the instance of the virtual function(s).

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

What is claimed is:

1. A dynamic retail media network system for generating a digital circular displayed to a user via a communications device based on a plurality of vendor parameters that dynamically trigger a generation and display of a plurality of circular content items included in the digital circular associated with a retailer, comprising:

at least one processor; and a memory coupled with the at least one processor, the memory including instructions that when executed by the at least one processor cause the at least one processor to:

provide access to a digital media platform associated with the retailer in response to an end user selection of a digital advertisement of a plurality of digital advertisements, each digital advertisement of the plurality of advertisements being associated with the retailer and a different vendor of a plurality of vendors that vend with the retailer;

trigger the vendor parameters associated with a vendor of the selected digital advertisement to determine a position of each item card of a plurality of item cards to be displayed in the digital circular associated with the retailer based on the vendor parameters associated with the vendor of the selected digital advertisement, wherein the vendor parameters associated with the vendor of the selected digital advertisement are indicative of a presentation of each item card as displayed in the digital circular of the retailer and are based on a vendor priority to display the selected item card associated with the vendor of the selected digital advertisement as compared to item cards not associated with the vendor of the selected digital advertisement;

dynamically generate the digital circular of the retailer that includes the item cards created based on the vendor parameters associated with the vendor of the selected digital advertisement that displays in real-time the selected item card based on the display request of the vendor of the selected digital advertisement, wherein the selected item card is displayed in real-time based on the display request of the vendor of the selected digital advertisement as compared to the item cards not associated with the vendor of the selected digital advertisement based on a current state of the vendor parameters;

dynamically receive updates to the vendor parameters associated with each corresponding item card that are updated in real-time based on the selections by the vendor of different item cards in the digital circular to continuously identify product preferences of the vendor, wherein each item card changes as the corresponding vendor parameters associated with each item card change;

dynamically adjust the digital circular grid as formatted on a display of the communications device to dynamically display updates to each item card included in the digital circular grid to update an item card position and item card size of each item card and integrating the updated vendor parameters as triggered by the selections by the vendor to continuously identify product preferences of the vendor thereby triggering a change to the item card content displayed and a change in size and spatial position as each item card in the digital circular is updated; and dynamically adjust the digital circular grid as formatted on the display of the communications device to prioritize the display of the selected item card in the digital circular based on the updated vendor parameters, wherein the size and spatial position of each item card is dynamically formatted to be displayed based on the content of each item card after the selected item card is dynamically formatted to be displayed based on the updated vendor parameters thereby displaying the selected item card based on the display request of the vendor of the selected digital advertisement as compared to item cards not associated with the vendor of the selected digital advertisement as triggered by the selections by the vendor to continuously identify the product preferences of the vendor.

2. The dynamic retail media network system of claim 1, wherein the processor is further configured to:

instruct the communications device display to dynamically adjust the display to display updates to a digital circular grid that displays each item card based on updates to a rearrangement of each item card due to a change in selection of the digital advertisement received from the end user, wherein a spatial position of each item card as displayed is dynamically adjusted as a plurality of vendor parameters associated with the change in selection of the digital advertisement are updated thereby triggering the rearrangement of each item card.

3. The dynamic retail media network system of claim 2, wherein the processor is further configured to:

generate the digital circular of the retailer that includes an item card position and an item card size associated with each item card partition that each item card is to be displayed based on the vendor parameters associated with the vendor of the selected digital advertisement, wherein the selected item card that corresponds to the selected digital advertisement is displayed in the item card position and the item card size that corresponds with the display request of the vendor of the selected digital advertisement as compared to the item cards not associated with the vendor of the selected digital advertisement.

4. The dynamic retail media network system of claim 3, wherein the processor is further configured to:

instruct the communications device to dynamically display each item card in an item card position and an item card size associated with each item card partition to prioritize the display of the selected item card in the digital circular of the retailer based on the vendor parameters, wherein the selected item card is dynamically formatted with item card content to dynamically display the selected item card with the item card content as spatially positioned in a digital circular grid to prioritize the display of the item card content of the selected item card based on the vendor parameters.

5. The dynamic retail media network system of claim 4, wherein the processor is further configured to:

dynamically receive updates to the digital circular as each item card included in the digital circular are updated based on the corresponding vendor parameters associated with each corresponding selected digital advertisement in real-time, wherein each item card changes as the corresponding vendor parameters associated with each corresponding selected digital advertisement change; and dynamically instruct the communications device to display each updated item card included in the digital circular in real-time as the corresponding vendor parameters associated with each corresponding selected digital advertisement change in real-time.

6. The dynamic retail media network system of claim 5, wherein the processor is further configured to:

dynamically receive updates to the digital circular as a size associated with each item card in the digital circular is adjusted based on the corresponding vendor parameters associated with each corresponding selected digital advertisement are updated in real-time thereby triggering a change in size associated with each item card as the corresponding vendor parameters associated with each selected digital advertisement change; and dynamically instruct the communications device to display each updated size of each updated item card included in the digital circular in real-time as the corresponding vendor parameters associated with each selected digital advertisement are updated in real-time triggering a change in size associated with each item card.

7. The dynamic retail media network system of claim 1, wherein the processor is further configured to:

receive from the end user a first selection of a first digital advertisement associated with a first vendor that is displayed on the digital media platform associated with the retailer with a second digital advertisement associated with a second vendor displayed on the digital media platform associated with the retailer;

trigger a first set of vendor parameters associated with the first vendor of the selected digital advertisement to determine the position of a first item card associated with the selected first digital advertisement of the first vendor to be displayed in the digital circular associated with the retailer based on the first set of vendor parameters associated with the first vendor, wherein the first set of vendor parameters associated with the first vendor of the selected first digital advertisement are indicative of a presentation of the first item card as displayed in the digital circular of the retailer based on a first vendor priority of the first vendor to display the first item card as compared to a display of the second item card not included in the selected first digital advertisement;

generate the digital circular of the retailer that includes the first item card positioned based on the first vendor parameters associated with the first vendor of the selected first digital advertisement that displays the first item card based on the display request of the first vendor of the first selected digital advertisement and includes the second item card positioned in a secondary position as compared to the first item card, wherein the secondary position of the second item card is determined after the first item card is positioned based on the first vendor parameters; and instruct the communications device to dynamically display the first item card in a first item card position and a first item card size to prioritize the display of the first item card as compared to the second item card that is displayed in a secondary item card position and a secondary item card size to be secondary to the first item card position and the first item card size of the first item card.

8. The dynamic retail media network system of claim 7, wherein the processor is further configured to:

receive from the end user a second selection of a second digital advertisement associated with the second vendor that is displayed on the digital media platform associated with the retailer with the first digital advertisement associated with the first vendor displayed on the digital media platform associated with the retailer;

trigger a second set of vendor parameters associated with the second vendor of the selected digital advertisement to determine the position of the second item card associated with the selected second digital advertisement of the second vendor to be displayed in the digital circular associated with the second set of vendor parameters associated with the second vendor, wherein the second set of vendor parameters associated with the second vendor of the selected second digital advertisement are indicative of a presentation of the second item card as displayed in the digital circular of the retailer based on a second vendor priority of the second vendor to display the second item card as compared to the display of the first item card included in the first digital advertisement;

rearrange the positioning of the second item card and the first item card based on the second vendor parameters associated with the second vendor of the selected second digital advertisement based on the display request of the second vendor of the second selected digital advertisement and includes the first item card positioned in the secondary position as compared to the second item card, wherein the second item card replaces the position of the first item card and moves the first item card to the secondary position; and instruct the communications device to dynamically display the second item card in the first item card position and the first item card size to prioritize the display of the second item card as compared to the first item card that is displayed in secondary position.

9. The dynamic retail media network system of claim 8, wherein the processor is further configured to:

monitor each end user from a plurality of end users that selects the first digital advertisement associated with the first vendor that is displayed on the digital media platform associated with the retailer via a corresponding communications device of each end user;

track each end user as each end user navigates the digital circular of the retailer to determine whether each end user selects the first item card positioned in the digital circular based on the first vendor position provided by the first set of vendor parameters;

determine each end user that purchases a first product as advertised in the first digital advertisement and displayed in the first item card of the digital circular based on selecting the first digital advertisement advertising the first product and selecting the first item card of the digital circular displaying the first product; and provide to the first vendor a quantity of end users that purchases the first product as advertised in the first digital advertisement and displayed in the first item card of the digital circular based on selecting the first digital advertisement advertising the first product and selecting the first item card of the digital circular displaying the first product.

10. The dynamic retail media network system of claim 9, wherein the processor is further configured to:

monitor each end user from the plurality of end users that selects the first digital advertisement associated with the first vendor that is displayed on the digital media platform associated with the retailer via the corresponding communications device of each end user;

track each end user that navigates the digital circular of the retailer to determine whether each end user selects the second item card positioned in the secondary position of the digital circular as compared to the first item card positioned in the digital circular based on the first vendor portion provided by the first set of vendor parameters;

determine each end user that purchases a second product as advertised as displayed in the second item card in the secondary position of the digital circular based on selecting the first digital advertisement advertising the first product and selecting the second item card of the digital circular displaying the second product in the secondary position; and providing to the second vendor a quantity of end users that purchase the second product as displayed in the second item card in the secondary position of the digital circular based on selecting the first digital advertisement advertising the first product and selecting the second item card of the digital circular displayed in the secondary position as compared to the first product.

11. A dynamic retail media network method for generating a digital circular displayed to a user via a communications device based on a plurality of vendor parameters that dynamically trigger a generation and display of a plurality of digital circular content items included in the digital circular associated with a retailer, comprising:

providing access to a digital media platform associated with the retailer in response to an end user selection of a digital advertisement of a plurality of digital advertisements, each digital advertisement of the plurality of advertisements being associated with the retailer and a different vendor of a plurality of vendors that vend with the retailer;

triggering the vendor parameters associated with a vendor of the selected digital advertisement to determine a position of each item card of a plurality of item cards to be displayed in the digital circular associated with retailer based on the vendor parameters associated with the vendor of the selected digital advertisement, wherein the vendor parameters associated with the vendor of the selected digital advertisement are indicative of a presentation of each item card as displayed in the digital circular of the retailer and are based on a vendor priority to display the selected item card associated with the vendor of the selected digital advertisement as compared to item cards not associated with the vendor of the selected digital advertisement;

dynamically generating the digital circular of the retailer that includes the item cards created based on the vendor parameters associated with the vendor of the selected digital advertisement that displays in real-time the selected item card based on the display request of the vendor of the selected digital advertisement, wherein the selected item card is displayed in real-time based on the display request of the vendor of the selected digital advertisement as compared to the item cards not associated with the vendor of the selected digital advertisement based on a current state of the vendor parameters;

dynamically receiving updates to the vendor parameters associated with each corresponding item card that are updated in real-time based on the selections by the vendor of different item cards in the digital circular to continuously identify product preferences of the vendor, wherein each item card changes as the corresponding vendor parameters associated with each item card change; and dynamically adjusting the digital circular grid as formatted on a display of the communications device to dynamically display updates to each item card included in the digital circular grid to update an item card position and item card size of each item card and integrating the updated vendor parameters as triggered by the selections by the vendor to continuously identify product preferences of the vendor thereby triggering a change to the item card content displayed and a change in size and spatial position as each item car in the digital circular is updated; and dynamically adjusting the digital circular grid as formatted on the display of the communications device to prioritize the display of the selected item card in the digital circular based on the updated vendor parameters, wherein the size and spatial position of each item card is dynamically formatted to be displayed based on the content of each item card after the selected item card is dynamically formatted to be displayed based on the updated vendor parameters thereby displaying the selected item card based on the display request of the vendor of the selected digital advertisement as compared to item cards not associated with the vendor of the selected digital advertisement as triggered by the selections of the vendor to continuously identify the product preferences of the vendor.

12. The dynamic retail media network method of claim 11, wherein instructing the communications device comprises:

instructing the communications device to dynamically adjust the display to display updates to a digital circular grid that displays each item card based on updates to a rearrangement of each item card due to a change in selection of the digital advertisement received from the end user, wherein a spatial position of each item card as displayed is dynamically adjusted as a plurality of vendor parameters are associated with the change in selection of the digital advertisement are updated thereby triggering the rearrangement of each item card.

13. The dynamic retail media network method of claim 12, further comprising:

generating the digital circular of the retailer that includes an item card position and an item card size associated with each item card partition that each item card is to be displayed based on the vendor parameters associated with the vendor of the selected digital advertisement, wherein the selected item card that corresponds to the selected digital advertisement is displayed in the item card position and the item card size that corresponds with the display request of the vendor of the selected digital advertisement as compared to the item cards not associated with the vendor of the selected digital advertisement.

14. The dynamic retail media network method of claim 13, further comprising:

instructing the communications device to dynamically display each item card in an item card position and an item card size associated with each item card partition to prioritize the display of the selected item card in the digital circular of the retailer based on the vendor parameters, wherein the selected item card is dynamically formatted with item card content to dynamically display the selected item card with the item card content as spatially positioned in a digital circular grid to prioritize the display of the item card content of the selected item card based on the vendor parameters.

15. The dynamic retail media network method of claim 14, further comprising:

dynamically receiving updates to the digital circular as each item card included in the digital circular are updated based on the corresponding vendor parameters associated with each corresponding selected digital advertisement in real-time, wherein each item card changes as the corresponding vendor parameters associated with each corresponding selected digital advertisement change; and dynamically instructing the communications device to display each updated item card include in the digital circular in real-time as the corresponding vendor parameters associated with each corresponding selected digital advertisement change in real-time.

16. The dynamic retail media network method of claim 15, further comprising:

dynamically receiving updates to the digital circular as a size associated with each item card in the digital circular is adjusted based on the corresponding vendor parameters associated with each corresponding selected digital advertisement are updated in real-time thereby triggering a change in size associated with each item card as the corresponding vendor parameters associated with each selected digital advertisement change; and dynamically instructing the communications device to display each updated size of each updated item card included in the digital circular in real-time as the corresponding vendor parameters associated with each selected digital advertisement are updated in real-time triggering a change in size associated with each item card.

17. The dynamic retail media network method of claim 11, further comprising:

receiving from the end user a first selection of a first digital advertisement associated with a first vendor that is displayed on the digital media platform associated with the retailer with a second digital advertisement associated with a second vendor displayed on the digital media platform associated with the retailer;

triggering a first set of vendor parameters associated with the first vendor of the selected digital advertisement to determine the position of the a first item card associated with the selected first digital advertisement of the first vendor to be displayed in the digital circular associated with the retailer based on the first set of vendor parameters associated with the first vendor, wherein the first set of vendor parameters associated with the first vendor of the selected first digital advertisement are indicative of presentation of the first item card as displayed in the digital circular of the retailer based on a first vendor priority of the first vendor to display the first item card as compared to a display of a second item card not included in the selected first digital advertisement;

generating the digital circular of the retailer that includes the first item card positioned based on the first vendor parameters associated with the first vendor of the selected first digital advertisement that displays the first item card based on the display request of the first vendor of the first selected digital advertisement and includes the second item card positioned in a secondary position as compared to the first item card, wherein the secondary position of the second item card is determined after the first item card is positioned based on the first vendor parameters; and instructing the communications device to dynamically display the first item card in a first item card position and a first item card size to prioritize the display of the first item card as compared to the second item card that is displayed in a secondary item card position and a secondary item card size to be secondary to the first item card position and the first item card size of the first item card.

18. The dynamic retail media network method of claim 17, further comprising:

receiving from the end user a second selection of a second digital advertisement associated with the second vendor that is displayed on the digital medial platform associated with the retailer with the first digital advertisement associated with the first vendor displayed on the digital medial platform associated with the retailer;

triggering a second set of vendor parameters associated with the second vendor of the selected digital advertisement to determine the position of the second item cared associated with the selected second digital advertisement of the second vendor to be displayed in the digital circular associated with the second set of vendor parameters associated with the second vendor, wherein the second set of vendor parameters associated with the second vendor of the selected second digital advertisement are indicative of a presentation of the second item card as displayed in the digital circular of the retailer based on a second vendor priority of the second vendor to display the second item card as compared to the display of the first item card included in the first digital advertisement;

rearranging the positioning of the second item card and the first item card based on the second vendor parameters associated with the second vendor of the selected second digital advertisement based on the display request of the second vendor of the second selected digital advertisement and includes the first item card positioned in the secondary position as compared to the second item card, wherein the second item card replaces the position of the first item card and moves the first item card to the secondary position; and instructing the communications device to dynamically display the second item card in the first item card position and the first item card to prioritize the display of the second item card as compared to the first item card that is displayed on the secondary position.

19. The dynamic retail media network method of claim 18, further comprising:

monitoring each end user from a plurality of end users that selects the first digital advertisement associated with the first vendor that is displayed on the digital media platform associated with the retailer via a corresponding communications device of each end user;

tracking each end user as each end user navigates the digital circular of the retailer to determine whether each end user selects the first item card positioned in the digital circular based on the first vendor position provided by the first set of vendor parameters;

determining each end user that purchases a first product as advertised in the first digital advertisement and displayed in the first item card of the digital circular based on selecting the first advertisement advertising the first product and selecting the first item card of the digital circular displaying the first product; and providing to the first vendor a quantity of end users that purchases the first product as advertised in the first digital advertisement and displayed in the first item card of the digital circular based on selecting the first digital advertisement advertising the first product and selecting the first item card of the digital circular displaying the first product.

20. The dynamic retail media network method of claim 19, further comprising:

monitoring each end user from the plurality of end users that selects the first digital advertisement associated with the first vendor that is displayed on the digital media platform associated with the retailer via the corresponding communications device of each end user;

tracking each end user that navigates the digital circular of the retailer to determine whether each end user selects the second item card positioned in the secondary position of the digital circular as compared to the first item card positioned in the digital circular based on the first vendor position provided by the first set of vendor parameters; and determining each end user that purchases a second product as advertised as displayed in the second item card in the secondary position of the digital circular based on selecting the first digital advertisement advertising the first product and selecting the second item card of the digital circular displaying the second product in the secondary position; and providing to the second vendor a quantity of end users that purchase the second product as displayed in the second item card in the secondary position of the digital circular based on selecting the first digital advertisement advertising the first product and selecting the second item card of the digital circular displayed in the secondary position as compared to the first product. 5

\*   \*   \*   \*   \*